United States Patent
Xu et al.

(10) Patent No.: US 11,910,263 B2
(45) Date of Patent: Feb. 20, 2024

(54) V2X NETWORK ASSISTED SIDE-LINK CONFIGURATION AND DATA TRANSMISSION

(71) Applicant: Apple Inc., Cupertino, CA (US)

(72) Inventors: Fangli Xu, Beijing (CN); Dawei Zhang, Saratoga, CA (US); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/896,443

(22) Filed: Aug. 26, 2022

(65) Prior Publication Data

US 2022/0417820 A1    Dec. 29, 2022

Related U.S. Application Data

(63) Continuation of application No. 16/782,414, filed on Feb. 5, 2020, now Pat. No. 11,432,220.

(30) Foreign Application Priority Data

Feb. 13, 2019    (CN) .......................... 201910112790.5

(51) Int. Cl.
*H04W 76/27* (2018.01)
*H04W 76/10* (2018.01)
(Continued)

(52) U.S. Cl.
CPC .......... *H04W 36/305* (2018.08); *H04W 4/40* (2018.02); *H04W 36/0011* (2013.01);
(Continued)

(58) Field of Classification Search
CPC . H04W 36/305; H04W 4/40; H04W 36/0011; H04W 36/08; H04W 68/005;
(Continued)

(56) References Cited

U.S. PATENT DOCUMENTS 10,064,212 B2    8/2018    Faurie
10,159,061 B2    12/2018   Zhao
(Continued)

FOREIGN PATENT DOCUMENTS

CN    102647246    8/2012
CN    105474684    4/2016
(Continued)

OTHER PUBLICATIONS

ZTE, "Study on High Mobility Scenario in V2X," 3GPP TSG-RAN WG2 Meeting #93bis, R2-162406, Dubrovnik, Croatia, Apr. 11-15, 2016, pp. 1-4; (Year: 2016).*
(Continued)

*Primary Examiner* — Un C Cho
*Assistant Examiner* — Lalita W Pace
(74) *Attorney, Agent, or Firm* — Kowert, Hood, Munyon, Rankin & Goetzel, P.C.

(57) ABSTRACT

Apparatuses, systems, and methods for a user equipment device (UE) to perform methods for network assisted side-link resource configuration for unicast and/or multi-cast/groupcast communications in V2X networks. A UE may, after establishing an RRC connection with a base station, transmit, to the base station, V2X connection information. The V2X connection information may include a V2X identifier associated with the UE and a V2X identifier associated (Continued)

with a target UE. The UE may receive, from the base station, a side-link configuration for data transmission with the target UE. The side-link configuration may include a resource allocation defined in time and frequency (e.g., a transmit/receive pool). The UE may communicate with the target UE using the resource allocation included in the side-link configuration.

20 Claims, 23 Drawing Sheets

(51) Int. Cl.
| | |
|---|---|
| *H04W 36/00* | (2009.01) |
| *H04W 36/30* | (2009.01) |
| *H04W 4/40* | (2018.01) |
| *H04W 36/08* | (2009.01) |
| *H04W 68/00* | (2009.01) |
| *H04W 72/044* | (2023.01) |

(52) U.S. Cl.
CPC ......... *H04W 36/08* (2013.01); *H04W 68/005* (2013.01); *H04W 72/044* (2013.01); *H04W 76/10* (2018.02); *H04W 76/27* (2018.02)

(58) Field of Classification Search
CPC ... H04W 72/044; H04W 76/10; H04W 76/27; H04W 72/23; H04W 36/03; H04W 92/18; H04W 4/46; H04W 72/40; H04W 72/02; H04W 72/04; H04W 72/12
See application file for complete search history.

(56) References Cited

U.S. PATENT DOCUMENTS

| | | | |
|---|---|---|---|
| 10,367,677 B2 | 7/2019 | Parkvall | |
| 2011/0098043 A1 | 4/2011 | Yu | |
| 2012/0163235 A1 | 6/2012 | Ho | |
| 2013/0242866 A1 | 9/2013 | Lin | |
| 2013/0244661 A1* | 9/2013 | Lin | H04W 76/14 455/436 |
| 2014/0194124 A1* | 7/2014 | Xiao | H04L 25/03949 455/437 |
| 2014/0328310 A1 | 11/2014 | Xu | |
| 2015/0195865 A1 | 7/2015 | Lee | |
| 2015/0271861 A1 | 9/2015 | Li | |
| 2015/0312960 A1 | 10/2015 | Kim | |
| 2016/0226857 A1 | 8/2016 | Liu | |
| 2017/0006565 A1 | 1/2017 | Adachi | |
| 2017/0099624 A1 | 4/2017 | Baghel | |
| 2017/0188391 A1* | 6/2017 | Rajagopal | H04W 28/0284 |
| 2017/0257803 A1* | 9/2017 | Tenny | H04W 76/14 |
| 2017/0366920 A1* | 12/2017 | Agiwal | H04W 36/0072 |
| 2018/0049259 A1 | 2/2018 | Aminaka | |
| 2018/0098250 A1* | 4/2018 | Vrzic | H04W 36/0016 |
| 2018/0109937 A1 | 4/2018 | Lee | |
| 2018/0124650 A1* | 5/2018 | Park | H04W 36/0016 |
| 2018/0227943 A1 | 8/2018 | Xiao | |
| 2018/0241508 A1 | 8/2018 | Chervyakov | |
| 2018/0295481 A1 | 10/2018 | Kahtava | |
| 2018/0295655 A1* | 10/2018 | Cavalcanti | H04W 76/10 |
| 2018/0332585 A1 | 11/2018 | Faurie | |
| 2018/0368191 A1 | 12/2018 | Vutukuri | |
| 2019/0215685 A1 | 7/2019 | Wang | |
| 2019/0215801 A1* | 7/2019 | Mok | H04W 76/27 |
| 2019/0239112 A1 | 8/2019 | Rao | |
| 2019/0261216 A1 | 8/2019 | Lee | |
| 2019/0306912 A1 | 10/2019 | Cheng | |
| 2019/0335532 A1 | 10/2019 | Kim | |
| 2019/0357280 A1 | 11/2019 | Lee | |
| 2020/0037132 A1 | 1/2020 | Wu | |
| 2020/0128470 A1 | 4/2020 | Mok | |
| 2020/0229145 A1 | 7/2020 | Kang | |
| 2021/0258853 A1* | 8/2021 | Wang | H04W 28/0268 |
| 2022/0039082 A1* | 2/2022 | Belleschi | H04W 72/51 |
| 2022/0322369 A1* | 10/2022 | Wu | H04L 5/0053 |
| 2023/0217519 A1* | 7/2023 | Vutukuri | H04W 4/70 455/509 |

FOREIGN PATENT DOCUMENTS

| | | | |
|---|---|---|---|
| CN | 106559732 | 4/2017 | |
| CN | 107295454 | 10/2017 | |
| CN | 107852696 | 3/2018 | |
| WO | 2017049595 | 3/2017 | |
| WO | WO/2018/203316 A1 | 11/2018 | |
| WO | WO-2020069295 A1 * | 4/2020 | H04W 4/06 |

OTHER PUBLICATIONS

Tsolkas et al., "Enabling D2D communications in LTE networks," 2013 IEEE 24th Annual International Symposium on Personal, Indoor, and Mobile Radio Communications (PIMRC), London, UK, 2013, pp. 2846-2850 (Year: 2013).*
First Office Action for Chinese Patent Application No. 201910112790. 5; dated Jan. 6, 2022.
ZTE "Discussion on the coordination of D2D resource for inter-cell D2D discovery and communication"; 3GPP TSG RAN WG3 Meeting #83 R3-140047; Prague, Czech; 6 pages; Feb. 10-14, 2014.
Ericsson "Mobility for D2D UEs"; 3GPP TSG-RAN WG3 #82 R3-132277; San Francisco, USA; 6 pages; Nov. 11-15, 2013.
Huawei "RAN3 Considerations for Proximity Discovery"; 3GPP TSG RAN WG3 Meeting #83 R3-140266; Prague, Czech Republic; 6 pages; Feb. 10-14, 2014.
Interdigital "Discussion on Mobility Enhancements for V2X"; 3GPP TSG-RAN WG2 #93bis R2-162823; Dubrovnik, Croatia; 4 pages; Apr. 11-15, 2016.
3GPP TS 36.213 V15.4.0 (Dec. 2018), 3rd Generation Partnership Project, Technical Specification Group Radio Access Network; Evolved Universal Terrestrial Radio Access (E-UTRA); (Release 15), Contents and Sections 14-17; pp. 477-533. (Year: 2018).

* cited by examiner

V2X NETWORK ASSISTED SIDE-LINK CONFIGURATION AND DATA TRANSMISSION

PRIORITY DATA

This application is a continuation of U.S. patent application Ser. No. 16/782,414, titled "V2X Network Assisted Side-link Configuration and Data Transmission", filed Feb. 5, 2020, which claims benefit of priority to Chinese Application No. 201910112790.5, titled "V2X Network Assisted Side-link Configuration and Data Transmission", filed Feb. 13, 2019, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to perform network assisted side-link resource configuration for unicast and/or multi-cast/groupcast communications in V2X (vehicle to everything) networks.

The techniques described herein may be implemented in and/or used with a number of different types of devices, including but not limited to cellular phones, tablet computers, wearable computing devices, portable media players, and any of various other computing devices.

In some embodiments, a user equipment device (UE) may perform a method for network assisted side-link resource configuration. The UE may establish a radio resource control (RRC) connection with a base station and transmit, to the base station, V2X connection information. The V2X connection information may include a first V2X identifier associated with the UE and a second V2X identifier associated with a target UE (e.g., an intended side-link communication partner). The UE may receive, from the base station, a side-link configuration for data transmission with the target UE. The side-link configuration may include a resource allocation defined in time and frequency (e.g., a transmit/receive pool). The UE may communicate with the target UE using the resource allocation included in the side-link configuration. In some embodiments, the V2X information may also include at least one of a traffic quality of service requirement, a traffic pattern requirement, and/or, a V2X capability associated with the UE. In some embodiments the side-link configuration may also include at least one of layer two resource blocks and/or a layer one configuration.

In some embodiments, as part of a network assisted side-link resource configuration, a UE may receive, from a base station, a paging message associated with a V2X connection request from a source UE. In response to the paging message, the UE may establish, with the base station, an RRC connection and receive, from the base station, a side-link configuration for data transmission with the source UE. The side-link configuration may include a resource allocation defined in time and frequency (e.g., a transmit/receive pool). The UE may communicate with the source UE using the resource allocation included in the side-link configuration.

In some embodiments, a base station may perform a method for network assisted side-link resource configuration. The base station may receive, from a UE served by the base station, V2X information, including a first V2X identifier associated with the UE. In addition, the base station may receive, from the UE, a V2X connection request. The V2X connection request may include the first V2X identifier and a second V2X identifier associated with a target UE (e.g., an intended side-link communication partner). The base station may transmit, to a neighboring base station serving the target UE, a V2X UE pair request. The V2X UE pair request may include a side-link configuration for data transmissions between the UE and the target UE. The side-link configuration may include a resource allocation defined in time and frequency (e.g., a transmit/receive pool). The base station may receive, from the neighboring base station, a confirmation of the V2X UE pairing and transmit, to the UE, the side-link configuration.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
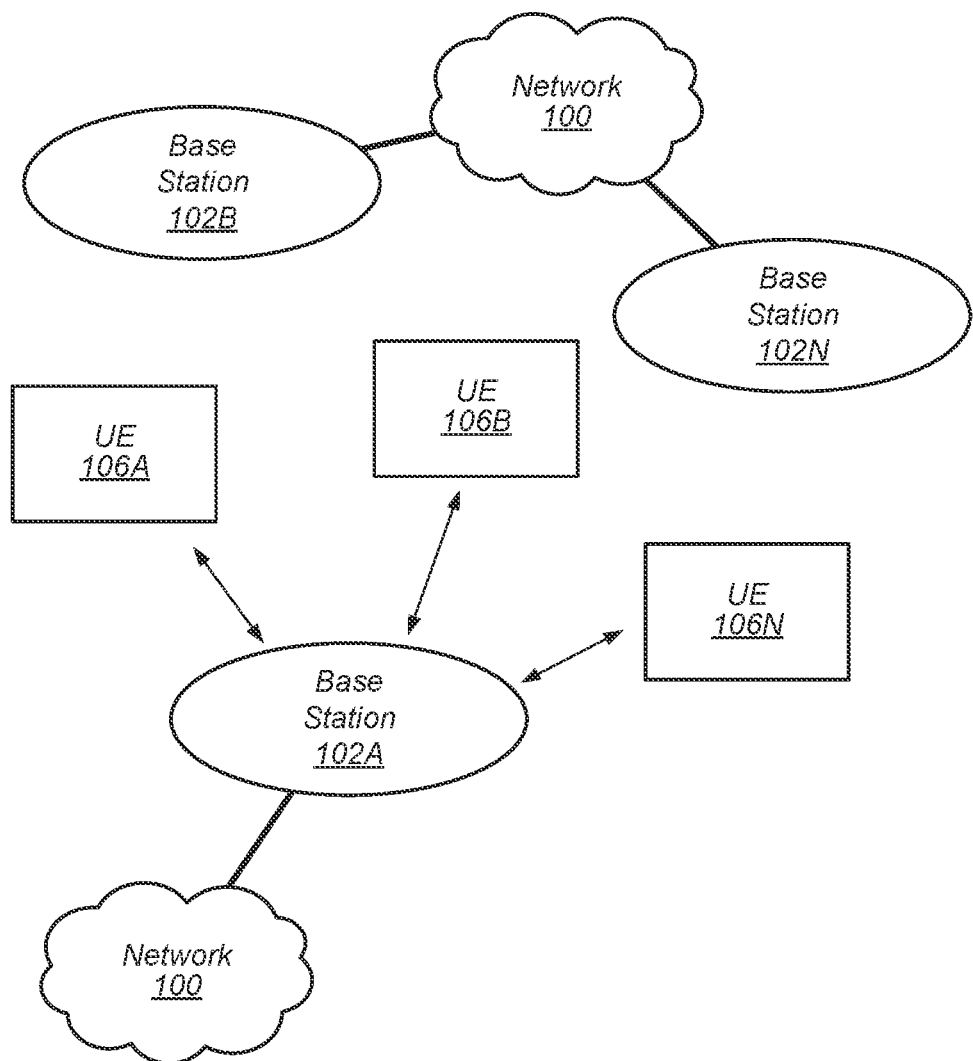
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The Following is a Glossary of Terms Used in this Disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™ Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Uu interface—refers to an over the air interface between a wireless device (such as a UE) and a base station (such as an eNB or a gNB). A Uu interface may be used by a wireless device to transmit data on an uplink to a base station and receive data on a downlink from a base station.

PC5 interface—refers to an over the air interface between wireless devices (such as a pair of UEs). A PC5 interface may be used by a wireless device to transmit data on a side-link to another wireless device or to receive data on a side-link from another wireless device.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
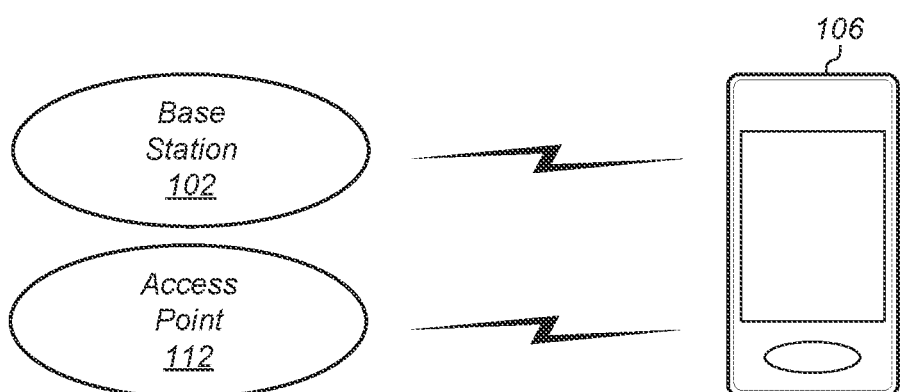
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
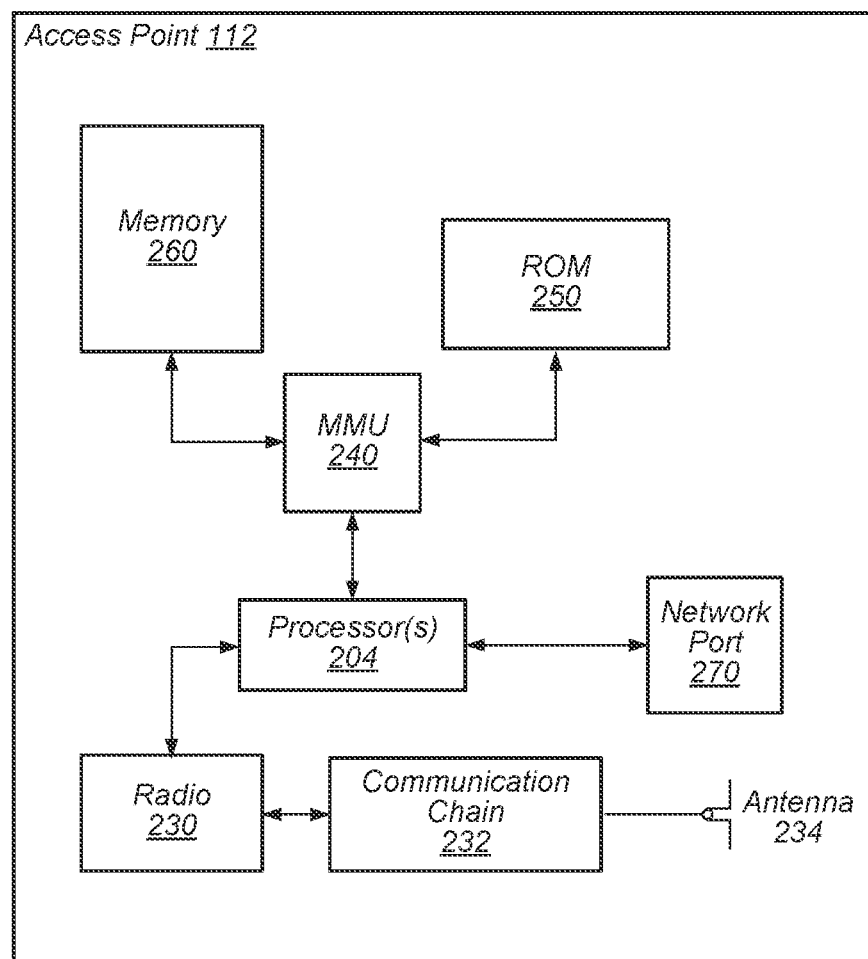
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for performing network assisted side-link resource configuration for unicast and/or multi-cast/groupcast communications in V2X (vehicle to everything) networks, e.g., as further described herein.

Figure 3:
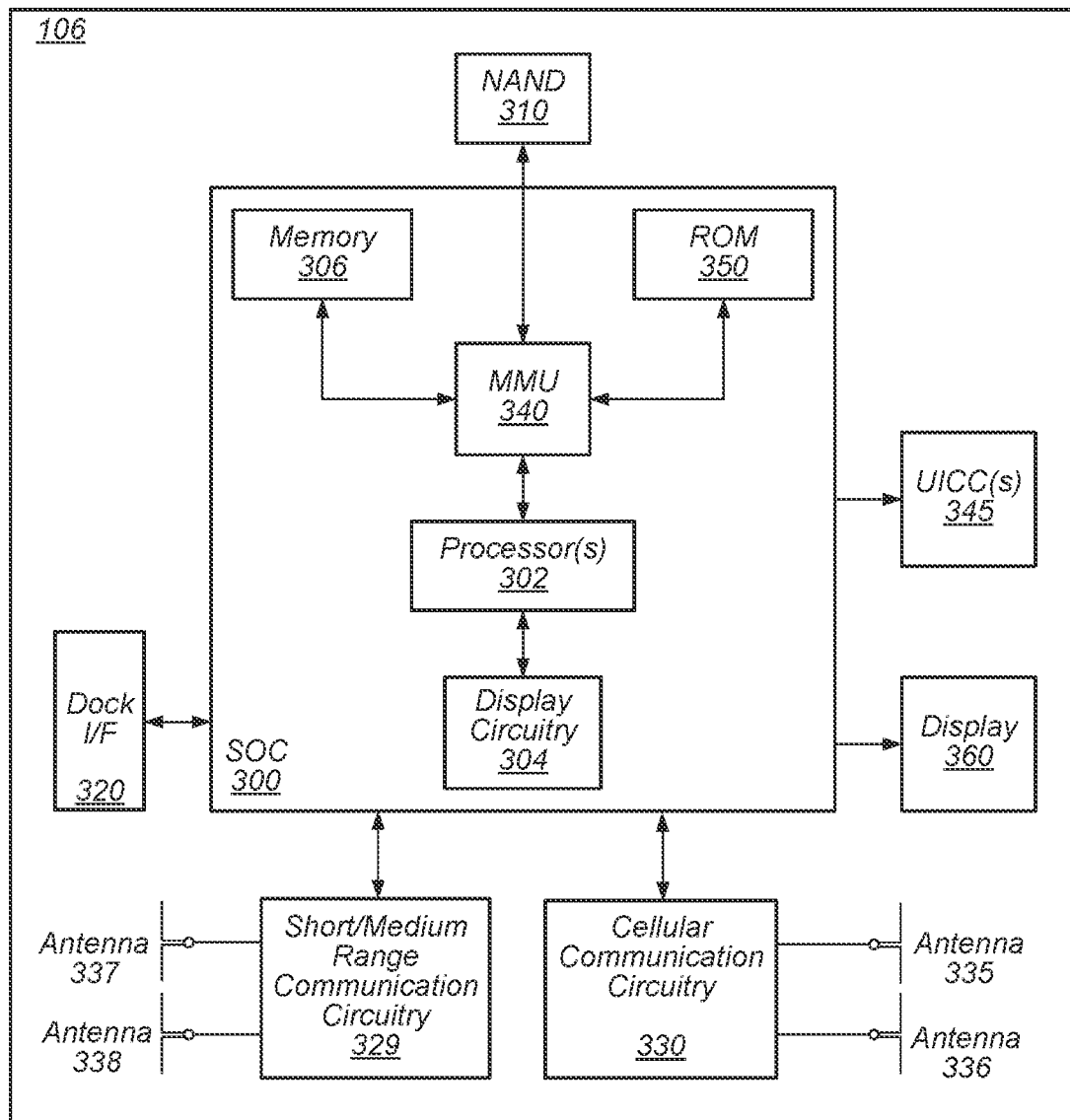
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for defining and using a resource map for semi-persistent resource reservations/scheduling for unicast and/or groupcast communications in V2X (vehicle to everything) networks, e.g., as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
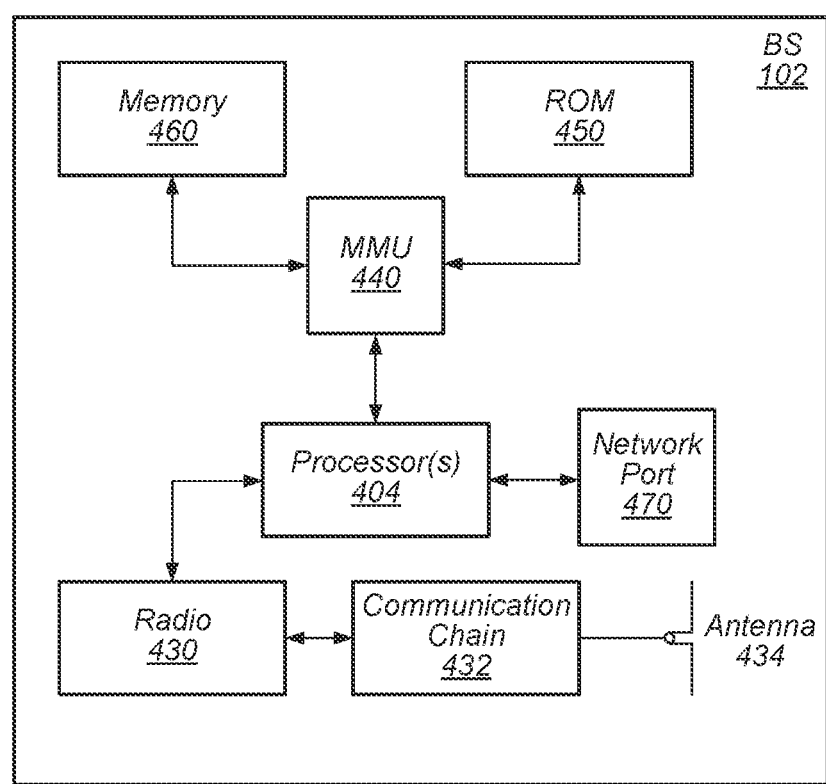
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein, e.g., for defining and using a resource map for semi-persistent resource reservations/scheduling for unicast and/or groupcast communications in V2X (vehicle to everything) networks. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
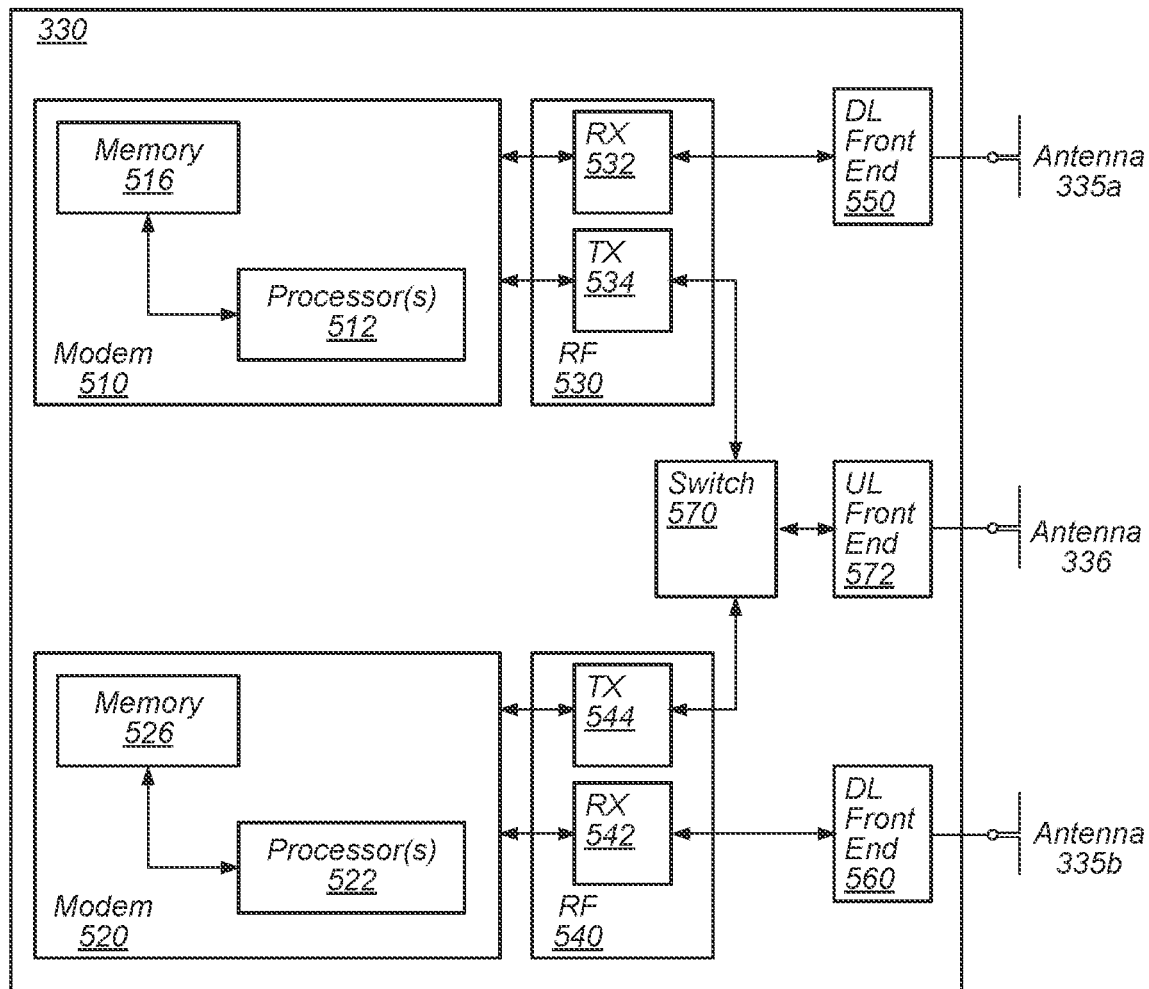
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to implement methods for performing network assisted side-link resource configuration for unicast and/or multi-cast/groupcast communications in V2X (vehicle to everything) networks, e.g., as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
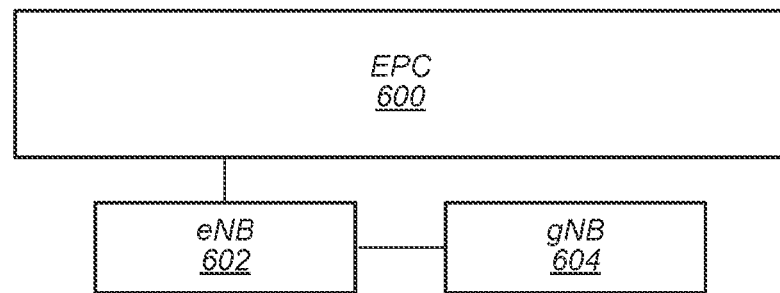
FIG. 6A illustrates an example of connections between an EPC network, an LTE base station (eNB), and a 5G NR base station (gNB).
Figure 6B:
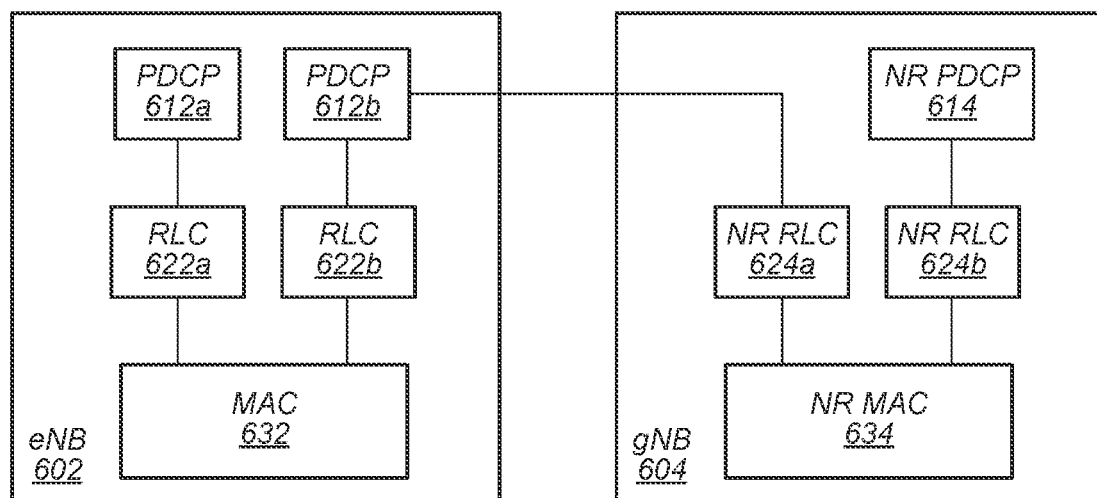
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
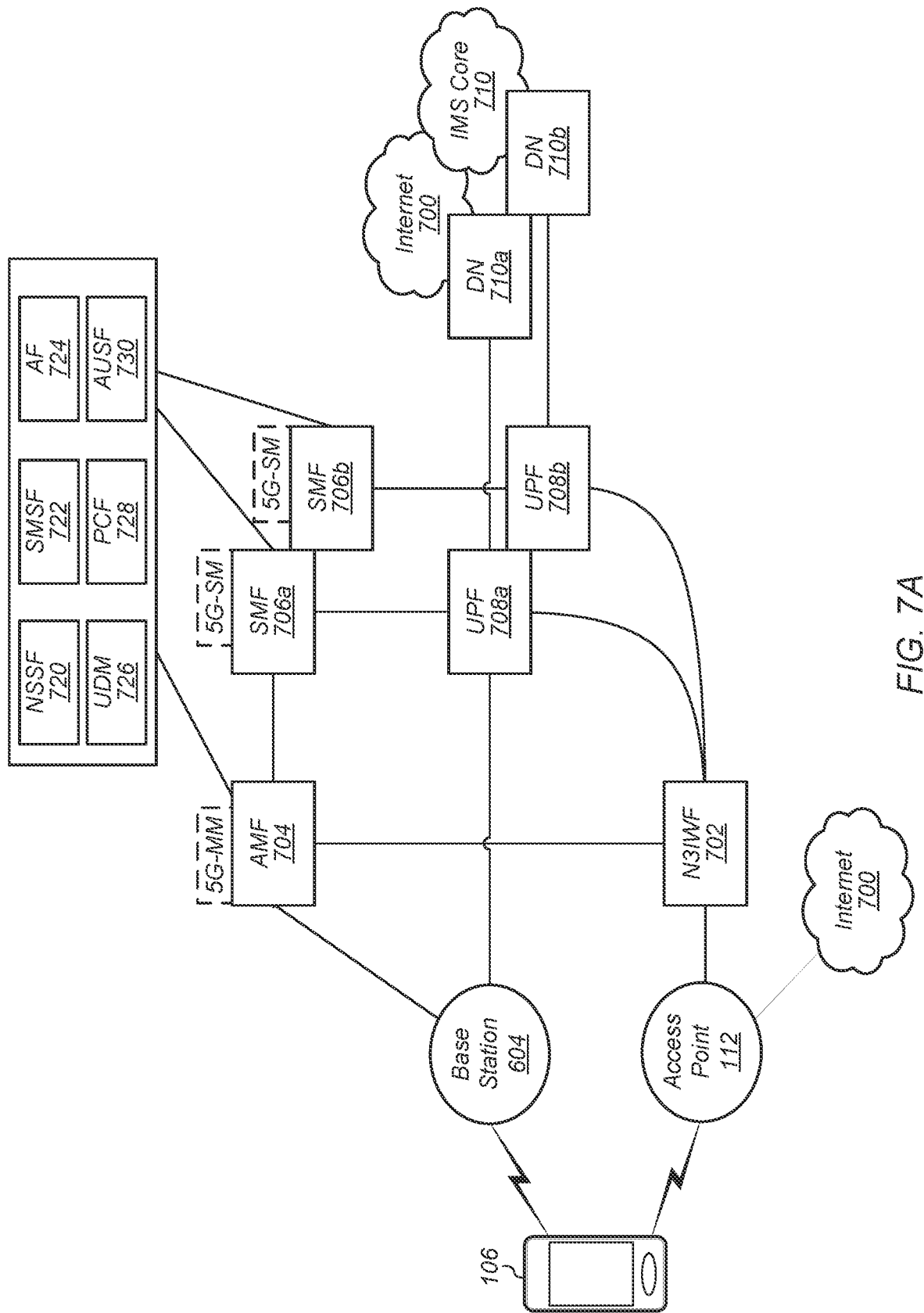
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
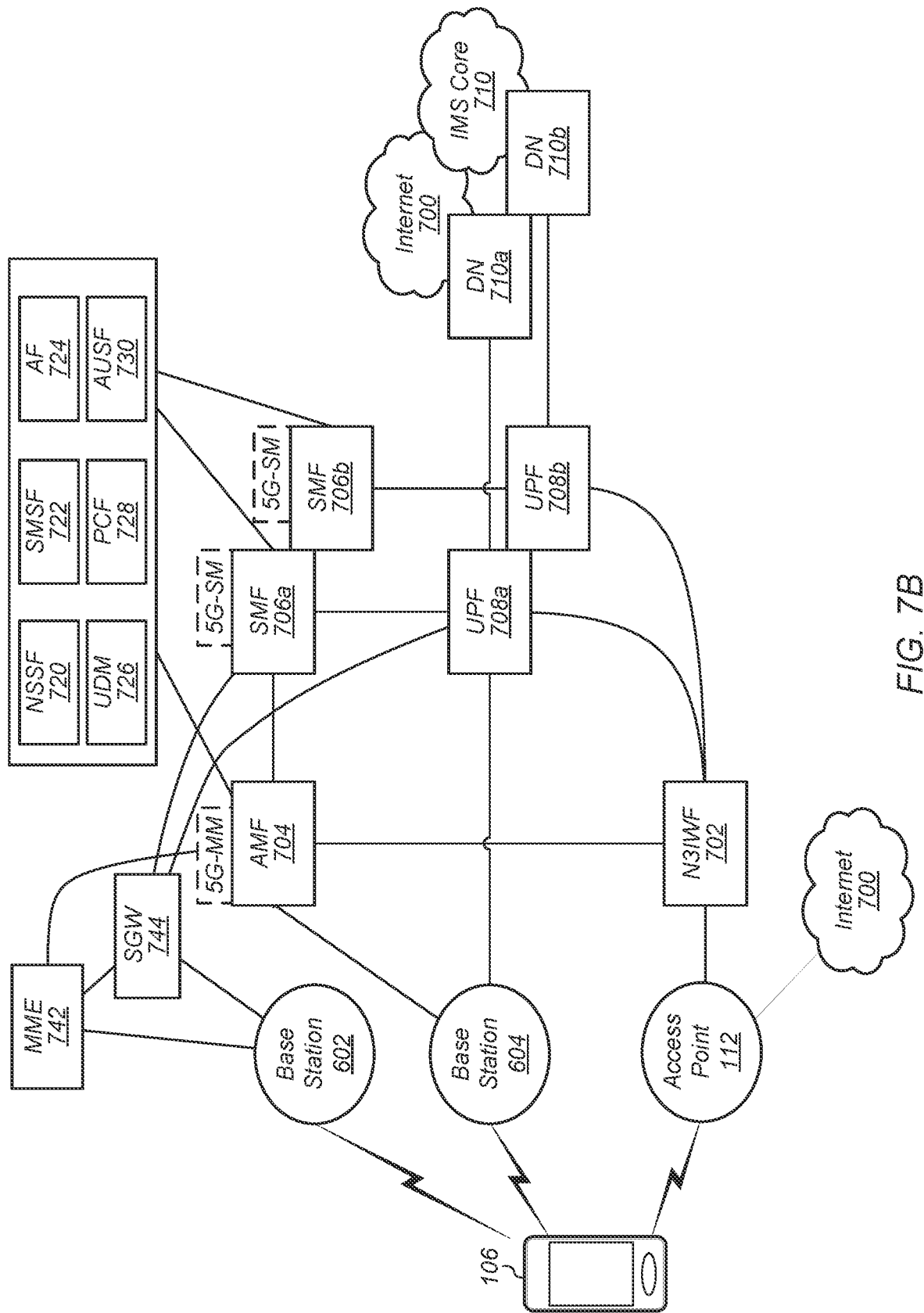
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to implement mechanisms for performing network assisted side-link resource configuration for unicast and/or multi-cast/groupcast communications in V2X (vehicle to everything) networks, e.g., as further described herein.

Figure 8:
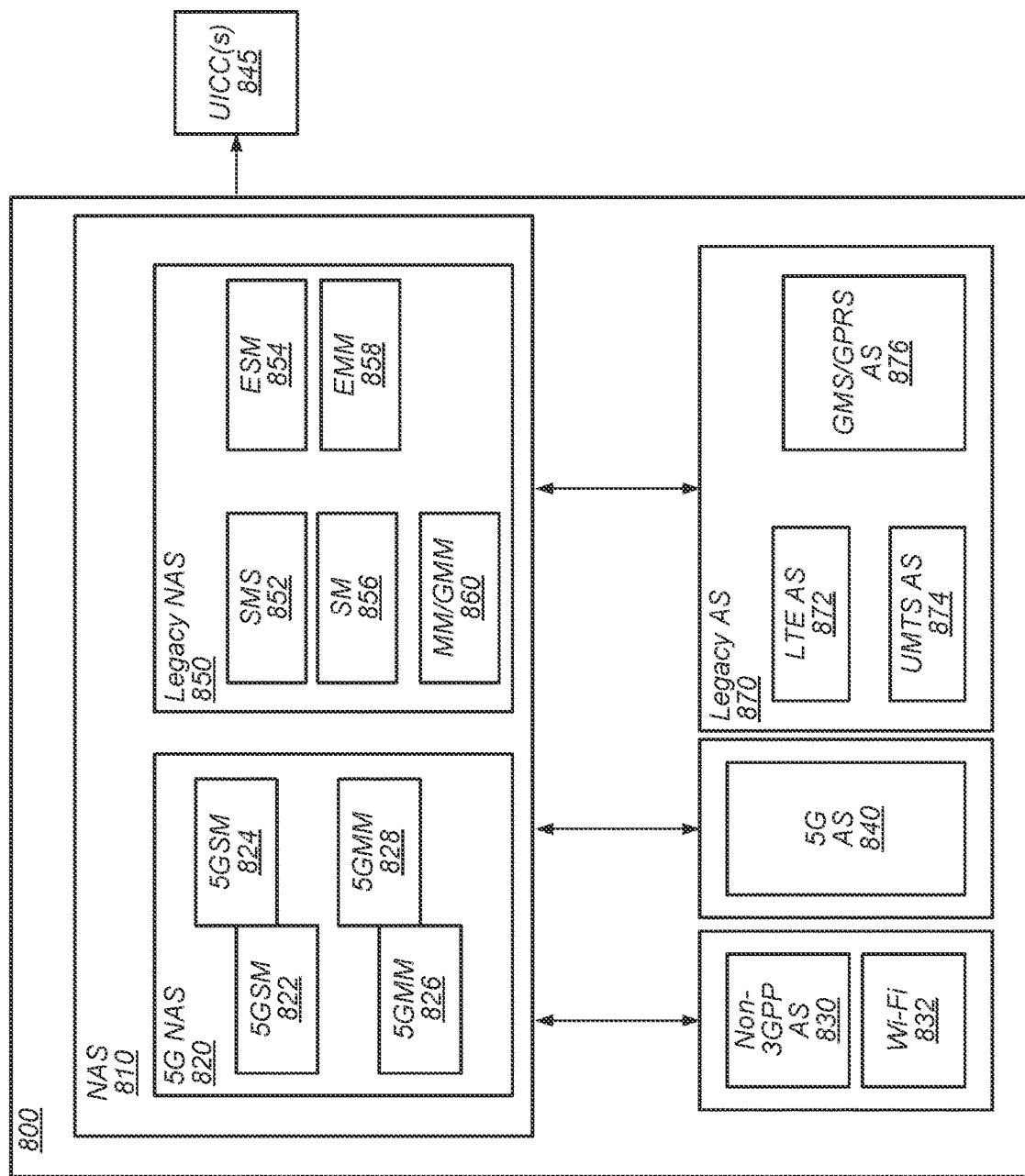
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for performing network assisted side-link resource configuration for unicast and/or multi-cast/groupcast communications in V2X (vehicle to everything) networks, e.g., as further described herein.

Network Assisted Side-Link Configuration

Figure 9:
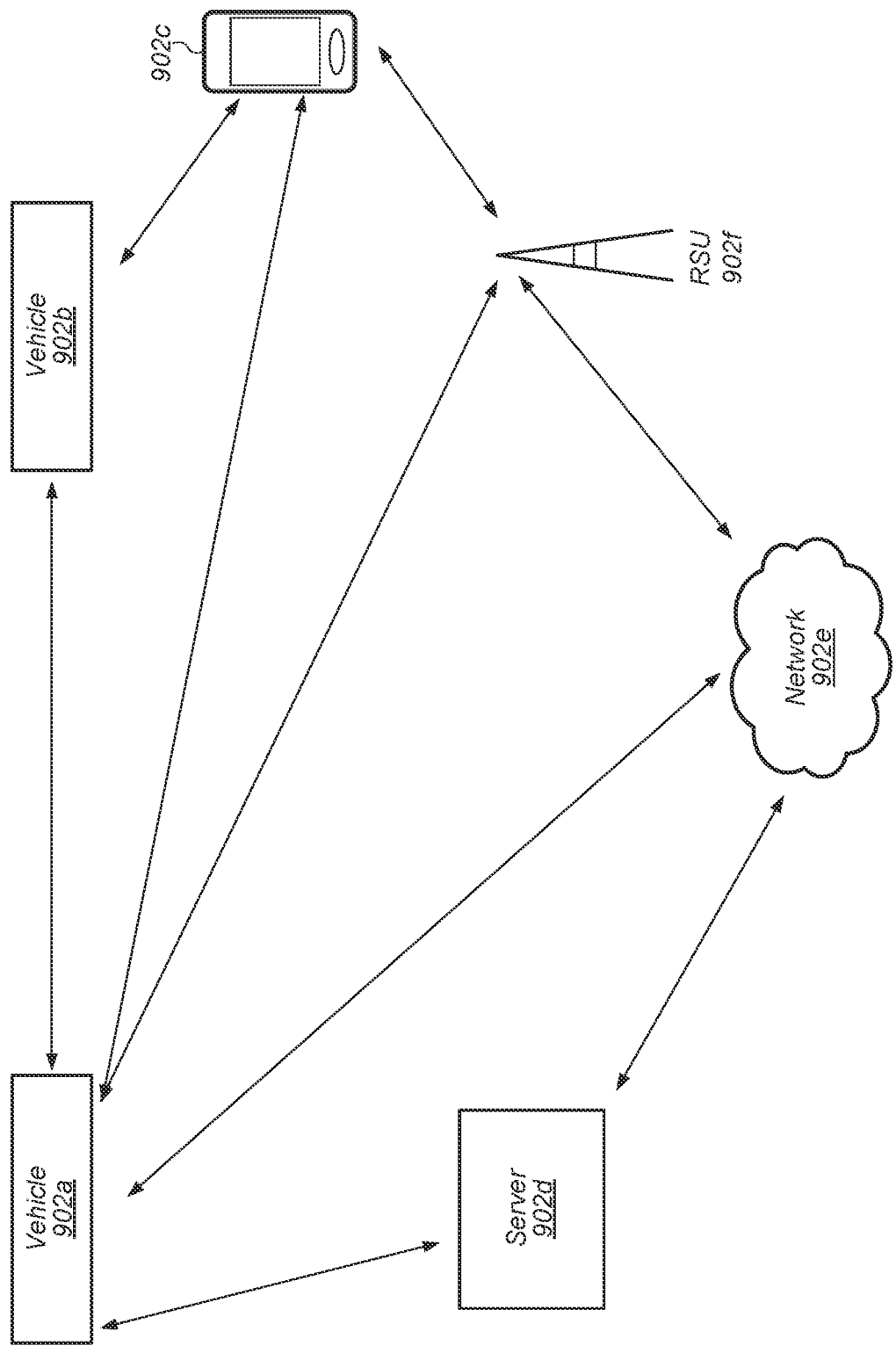
FIG. 9 illustrates an example of a vehicle-to-everything network.

In some existing implementations, vehicle-to-everything (V2X) communications, e.g., as specified by 3GPP TS 22.185 V.14.3.0, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 9, a vehicle, such as vehicle 902a, may communicate with various devices (e.g., devices 902b-f), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHz. Moreover, V2X communications may include unicast, multi-cast, groupcast, and/or broadcast communications. Each communication type may employ an LBT mechanism. Further, under the V2X communication protocol, a transmitter may reserve periodic slots within a reservation period.

In some existing implementations, 5G NR V2X may include various scheduling modes. For example, 5G NR V2X mode 1 may be designed for network assisted configuration of side-link transmission resources and 5G NR V2X mode 2 may be designed for UE self-determination of side-link transmission resources. However, under existing implementations (e.g., LTE V2X), there is no specific design for unicast transmissions. In addition, unicast transmission may only be visible in upper layers and not visible (or inviable) in access stratum (AS) layer. In some implementations, a quality of service (QoS) model may be used for unicast transmissions. In such implementations, a per-packet QoS model, based on PPPP/PPPR (proximity services (ProSe) Per Packet Priority per ProSe Per Packet Reliability), may be implemented without a bearer level or L2 level parameter configuration. Alternatively, 5G NR V2X mode 1 or mode 2 may be used for unicast transmissions. However, 5G NR V2X requirements for unicast specific AS configuration exchanges between devices (e.g., procedures/configurations for bearer level, handshaking, and so forth), may increase signaling overhead on a link that has lower quality (reliability) as compared to traditional uplink/downlink connections (e.g., via a Uu interface).

Embodiments described herein provide mechanisms for user equipment devices (UEs), such as UE 106, in connected mode to leverage network assistance to perform side-link AS configuration and PC5 connection setup and/or PC5 connection release. In some embodiments, relying on the network to configure/release side-link configuration may reduce signaling overhead on the side-link as well as increase reliability of configuration transmissions. Further, in some embodiments, relying on the network to relay important (e.g., high-priority) side-link data via Uu interface may improve transmission reliability.

In some embodiments, when a UE (such as UE 106) is in a connected mode (e.g., attached to a base station, such as gNB 604), the base station serving the UE may provide side-link configuration to the UE. In some embodiments, when a UE is not in connected mode (e.g., is in idle mode and/or inactive mode), the UE may initiate a radio resource control (RRC) connection setup procedure to attach to the network prior to the base station providing side-link configuration to the UE.

In some embodiments, for configuring a side-link unicast link, a base station may aid a UE in locating a target UE and setup a side-link for the UE pair. In addition, the base station may provide a side-link unicast configuration to both UEs. In some embodiments, when a UE enters connected mode, the UE may report (or indicate) its side-link identifier (SL ID) and/or side-link capability, to the base station. The base station may store the UE's side-link information as well as share the UE's side-link information with neighboring cells and/or neighboring base stations.

In some embodiments, when UE requests setup of a side-link unicast link, a base station may assist the UE in finding a target UE using the target UE's SL ID. In some embodiments, the base station may also use the target UE's cell radio network temporary identifier (C-RNTI), cell, and/or base station links to find the target UE. In some embodiments, if the target UE is in an idle and/or inactive state, the network may page the UE. In some embodiments, if the target UE is in an inactive state, the network may directly page the target UE within the RAN-based notification area (RNA). In some embodiments, if the target UE is in an idle state, a serving base station may directly page the target UE. In other words, the network may implement a paging mechanism that may be RAN triggered for idle UEs, e.g., with a paging area that could be the same and/or different from a core network (CN) paging area. In some embodiments, if the target UE is in an idle state, the base station may indicate the paging request to an MME/AMF. In some embodiments, the AMF may trigger the CN paging for side-link (V2X) usage.

In some embodiments, the network may maintain SL UE pair information for UEs that are in connected mode, e.g., via a Uu interface. In some embodiments, in case of side-link failure, the network may assist the UE in recovery of the side-link.

In some embodiments, the network may relay (or forward) side-link data from the UE to the targeted UE via a Uu interface. For example, the network may configure the same V2X bearer transmitted via both a Uu interface and a PC5 interface. In some embodiments, the network may operate in any of a duplication mode (same packets transmitted via both Uu and PC5 interfaces), split mode (different packets transmitted via the Uu interface and the PC5 interface), and/or fallback/switch mode (Uu interface used as a fallback during failure of side-link).

In some embodiments, a UE, such as UE 106 in connected mode (and/or as part of an attachment procedure), may provide a serving base station, such as gNB 604, with V2X information, such as a V2X identifier, a destination identifier (e.g., a V2X identifier for a target UE, such as another UE 106), traffic quality of service (QoS) requirements, and/or PC5 interface capabilities. The service base station (e.g., the network) may then provide, based at least in part on the V2X information provided by the UE, corresponding side-link access stratum (AS) configuration to the UE. The side-link AS configuration may be applicable to any or all of a unicast, groupcast, and/or broadcast transmission.

In some embodiments, once the serving base station receives the UE's V2X information, the serving base station may store the V2X information, including the UE's V2X identifier. Further, the serving base station may share the UE's V2X information amongst neighboring base stations and/or neighboring cells, e.g., to assist in side-link AS configuration for unicast transmissions. For example, when the UE wants to setup a side-link unicast transmission (e.g., a PC5 unicast transmission), the UE may provide a destination V2X identifier (e.g., of a target UE) to the serving base station. The serving base station may then perform V2X UE pairing according to, and/or based on, a mapping of UE V2X identifiers and serving cells/base stations. For example, the base station may check validity of the UE pair, e.g., the base station may acquire V2X information associated with the UE pair from the network via a V2X function and/or the V2X function may aid the base station in acquiring the V2X information associated with the UE pair from the network. Upon validation, the base station may complete the UE pairing if the target UE is in a connected state. Alternatively, upon validation, the network may page the target UE if the target UE is not in a connected state. Once the target UE has entered a connected state, the UE pairing may be completed.

In some embodiments, once the UE pairing is successfully completed, the network (e.g., base stations serving the UEs) may store the UE pairing information (e.g., V2X identifiers, capabilities, side-link configuration, C-RNTI, serving cell of each UE) and provide corresponding side-link AS configurations to each UE. In some embodiments, if the UE pairing fails, the network (e.g., serving base station) may indicate the pairing failure to the UE and provide the UE with pairing failure information. The UE may then indicate the failure to upper layers of the UE. In some embodiments, upon completion of the side-link transmissions, the UE may indicate completion information to the serving base station and the side-link configuration may be released from each UE.

Figure 10:
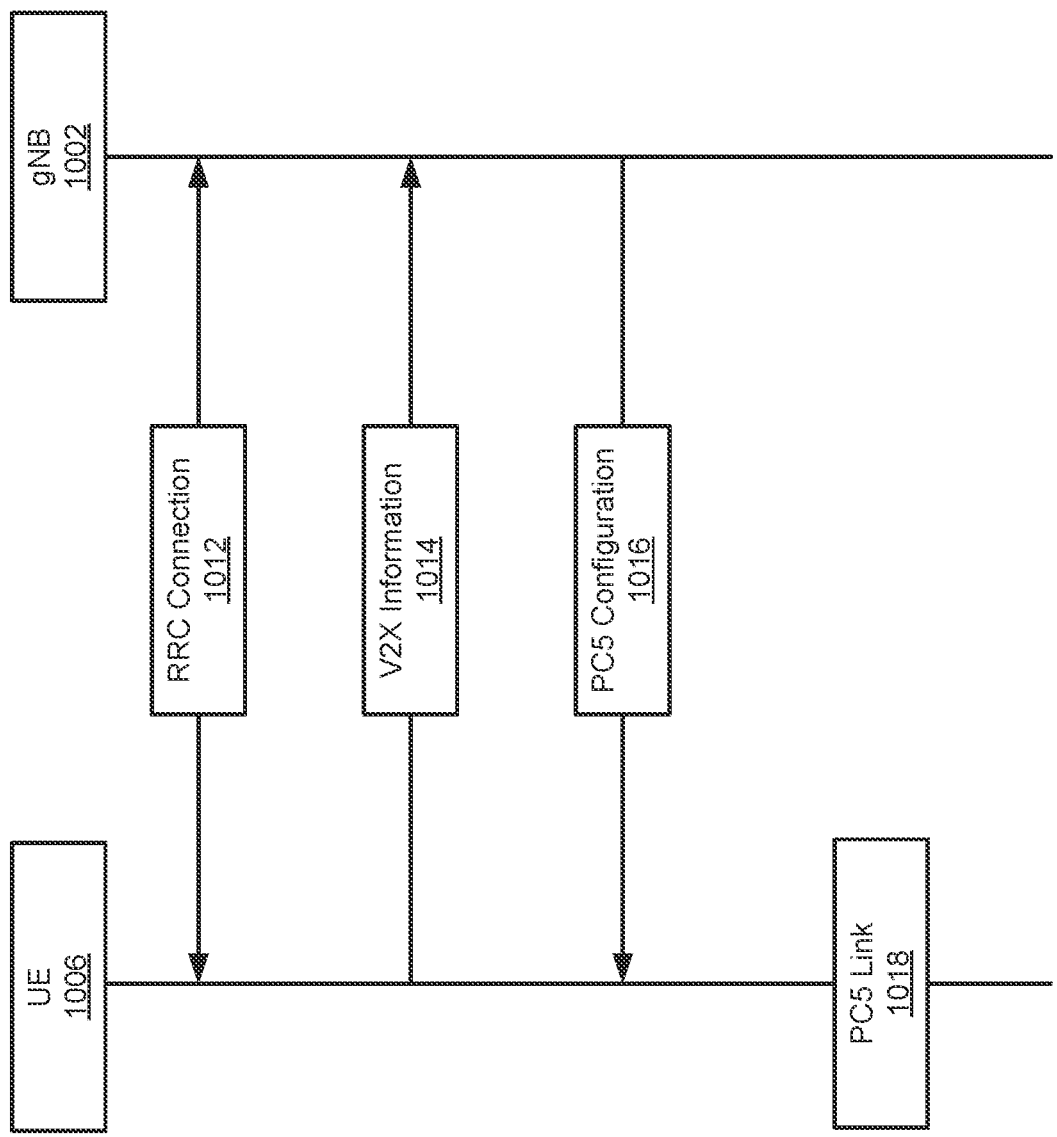
FIGS. 10-12 illustrate block diagrams of examples of signaling for network assisted side-link configuration and setup, according to some embodiments.

FIG. 10 illustrates a block diagram of an example of signaling for network assisted side-link configuration and setup, according to some embodiments. The signaling shown in FIG. 10 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1006, which may be a UE 106 as described above, may establish (or have previously established) a radio resource control (RRC) connection 1012 with a gNB 1002, which may be a base station 102 and/or a gNB 604 as described above. In other words, UE 1006 may be connected to (or in a connected state) with gNB 1002. Thus, gNB 1002 may be considered a serving base station of UE 1006. Further, UE 1006 may send (or transmit) V2X information 1014 to gNB 1002. In some embodiments, the V2X information may include a destination identifier, a V2X identifier associated with the UE 1006, traffic QoS requirements, traffic QoS pattern, and/or PC5 capabilities. In other words, the UE 1006 may request assistance with configuration of a side-link with a target UE. UE 1006 may receive a PC5 configuration 1016 from gNB 1002. The PC5 configuration 1016 may include any or all of layer 2 (L2) resource block (RB) allocation, L2 configuration, layer 1 (L1) configuration, a transmit/receive pool allocation, and/or an indication of a network scheduling method. Thereafter, the PC5 link 1018 between the UE and the target UE may be established.

Figure 11:
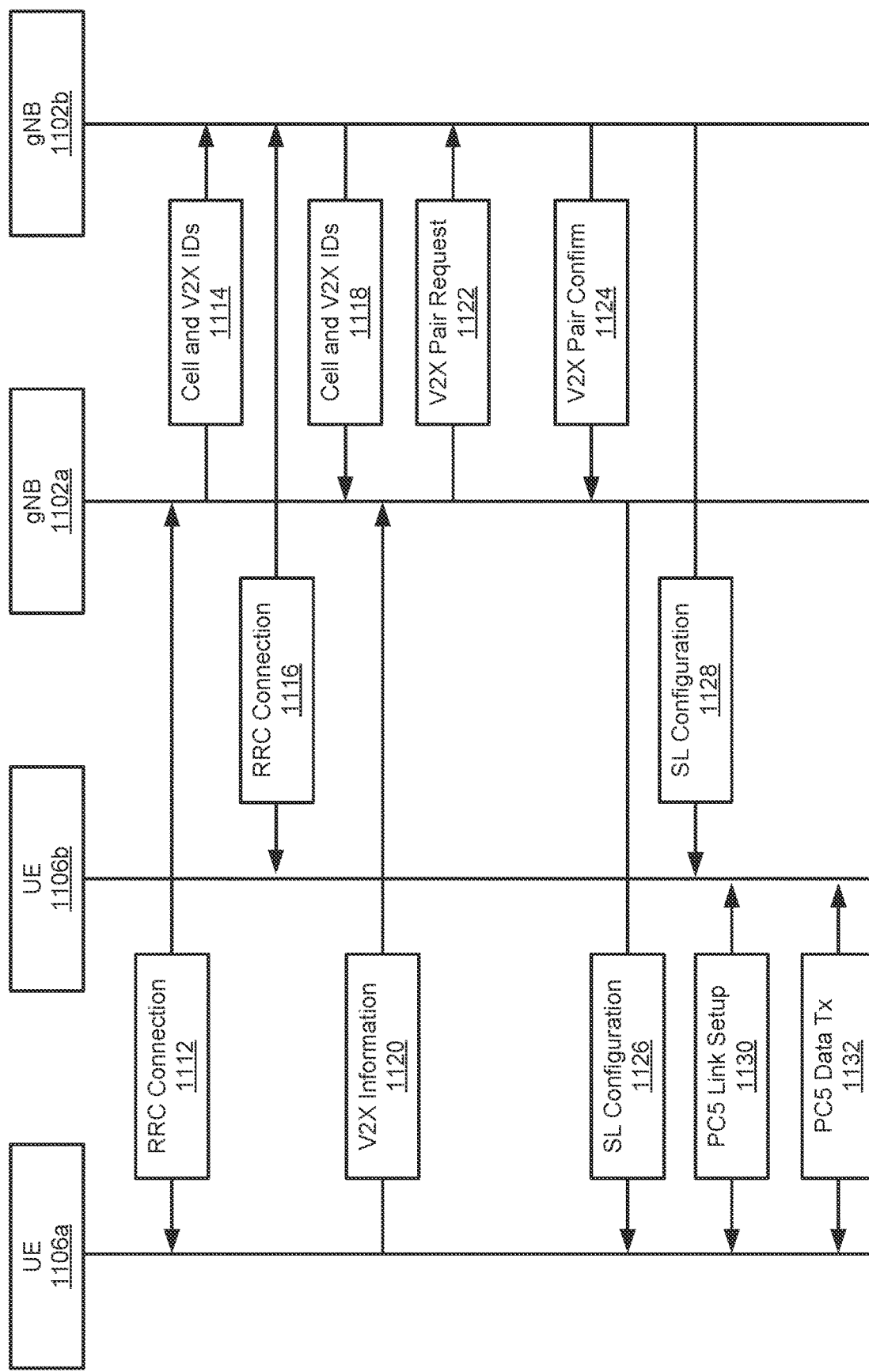

FIG. 11 illustrates a block diagram of another example of signaling for network assisted side-link configuration and setup, according to some embodiments. The signaling shown in FIG. 11 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1106a, which may be a UE 106 as described above, may establish (or have previously established) a radio resource control (RRC) connection 1112 with a gNB 1102a, which may be a base station 102 and/or a gNB 604 as described above. In other words, UE 1106a may be connected to (or in a connected state) with gNB 1102a. Thus, gNB 1102a may be considered a serving base station of UE 1106a. In some embodiments, as part of the connection procedure (and/or after establishment of the connection), the UE 1106a may send (or transmit/share) its V2X identifier, V2X capabilities, and associated cell information to base station 1106a.

Similarly, a UE 1106b, which may be a UE 106 as described above, may establish (or have previously established) a radio resource control (RRC) connection 1116 with a gNB 1102b, which may be a base station 102 and/or a gNB 604 as described above. In other words, UE 1106b may be connected to (or in a connected state) with gNB 1102b. Thus, gNB 1102b may be considered a serving base station of UE 1106b. In some embodiments, as part of the connection procedure (and/or after establishment of the connection), the UE 1106b may send (or transmit/share) its V2X identifier, V2X capabilities, and associated cell information to gNB 1102b.

The gNB 1102a may, after establishing a connection with UE 1106a, send (or transmit/share) V2X information (e.g., cell and V2X IDs 1114) associated with UE 1106a to gNB 1102b as well as the network in general. In some embodiments, the gNB 1102a may validate and/or authenticate the V2X information associated with UE 1106a prior to sharing UE 1106a's V2X information with the network (e.g., gNB 1102b). In some embodiments, gNB 1102a may perform a validity check and/or authentication based, at least in part, on any, any combination of, and/or all of an operations and management (OAM) channel check, core network (CN) key/authentication management field (AMF) key verification, and/or ProSe Function.

Similarly, gNB 1102b may, after establishing a connection with UE 1106b, send (or transmit/share) V2X information (e.g., cell and V2X IDs 1118) associated with UE 1106b to gNB 1102a as well as the network in general. In some embodiments, the gNB 1102b may validate and/or authenticate the V2X information associated with UE 1106b prior to sharing UE 1106b's V2X information with the network (e.g., gNB 1102a). In some embodiments, gNB 1102b may perform a validity check and/or authentication based, at least in part, on any, any combination of, and/or all of an operations and management (OAM) channel check, core network (CN) key/authentication management field (AMF) key verification, and/or ProSe Function.

UE 1106a may send (or transmit) V2X information 1120 to gNB 1102a. In some embodiments, the V2X information may include a destination identifier (e.g., identifying UE 1106b as a target UE), a V2X identifier associated with the UE 1106a, traffic QoS requirements, traffic QoS pattern, and/or PC5 capabilities. In other words, the UE 1106a may request assistance from gNB 1102a to configure a side-link with UE 1106b.

The gNB 1102a may send (or transmit/share) a V2X pair request 1122 with gNB 1102b. The V2X pair request 1122 may include a side-link configuration as well as the V2X identifier associated with the UE 1106b. The gNB 1102b may confirm the pairing of UEs 1106a and 1106b and may send (or transmit/share) a V2X pair confirmation 1124 with gNB 1102a.

UE 1106a may then receive a side-link (e.g., PC5) configuration 1126 from gNB 1102a. The side-link configuration 1126 may include any or all of layer 2 (L2) resource block (RB) allocation, L2 configuration, layer 1 (L1) configuration, a transmit/receive pool allocation, and/or an indication of a network scheduling method. Similarly, UE 1106b may receive a side-link (e.g., PC5) configuration 1128 from gNB 1102b. The side-link configuration 1128 may include any or all of layer 2 (L2) resource block (RB) allocation, L2 configuration, layer 1 (L1) configuration, a transmit/receive pool allocation, and/or an indication of a network scheduling method. Thereafter, the PC5 link 11130 between the UE 1106a and the UE 1106b may be established and PC5 data 1132 may be transmitted between the UE pair.

Figure 12:
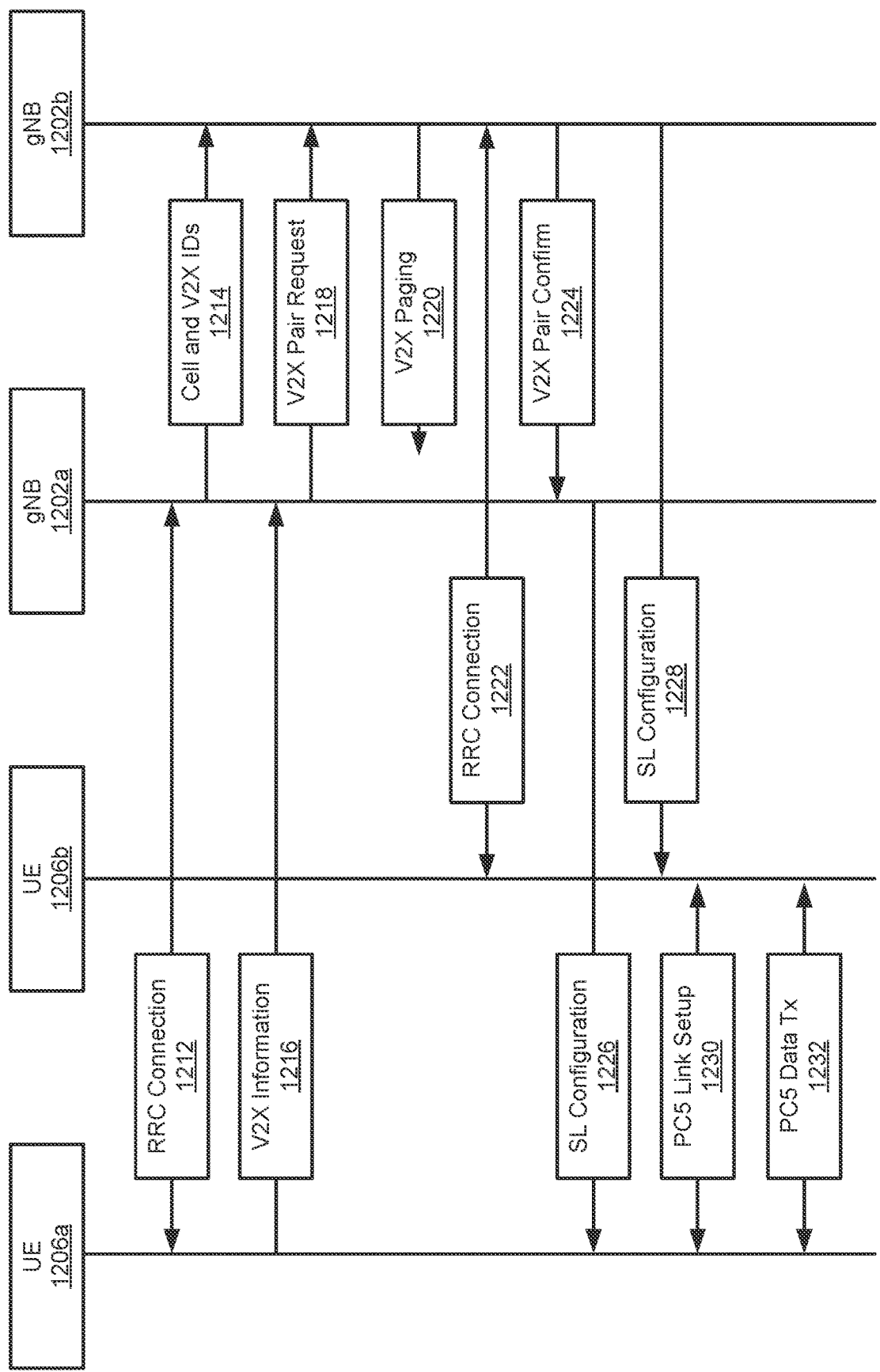

FIG. 12 illustrates a block diagram of another example of signaling for network assisted side-link configuration and setup, according to some embodiments. The signaling shown in FIG. 12 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1206a, which may be a UE 106 as described above, may establish (or have previously established) a radio resource control (RRC) connection 1212 with a gNB 1202a, which may be a base station 102 and/or a gNB 604 as described above. In other words, UE 1206a may be connected to (or in a connected state) with gNB 1202a. Thus, gNB 1202a may be considered a serving base station of UE 1206a. In some embodiments, as part of the connection procedure (and/or after establishment of the connection), the UE 1206a may send (or transmit/share) its V2X identifier, V2X capabilities, and associated cell information to gNB 1202a.

The gNB 1202a may, after establishing a connection with UE 1206a, send (or transmit/share) V2X information (e.g., cell and V2X IDs 1214) associated with UE 1206a to gNB 1202b as well as the network in general. In some embodiments, the gNB 1202a may validate and/or authenticate the V2X information associated with UE 1206a prior to sharing UE 1206a's V2X information with the network (e.g., gNB 1202b). In some embodiments, gNB 1202a may perform a validity check and/or authentication based, at least in part, on any, any combination of, and/or all of an operations and management (OAM) channel check, core network (CN) key/authentication management field (AMF) key verification, and/or ProSe Function.

UE 1206a may send (or transmit) V2X information 1216 to gNB 1202a. In some embodiments, the V2X information may include a destination identifier (e.g., identifying UE 1206b as a target UE), a V2X identifier associated with the UE 1206a, traffic QoS requirements, traffic QoS pattern, and/or PC5 capabilities. In other words, the UE 1206a may request assistance from gNB 1202a to configure a side-link with UE 1206b.

The gNB 1202a may send (or transmit/share) a V2X pair request 1218 with gNB 1202b. The V2X pair request 1218 may include a side-link configuration as well as the V2X identifier associated with the UE 1206b. The gNB 1202b may determine that UE 1206b is not in a connected state. In response, the gNB 1202b may broadcast V2X paging 1220 requesting UE 1206b establish a connection with gNB 1202b. In some embodiments, if UE 1206b is in an inactive state, the gNB 1202b may directly page UE 1206b within the RAN-based notification area (RNA). In some embodiments, if UE 1206b is in an idle state, gNB 1202b may directly page UE 1206b. In other words, the network may implement a paging mechanism that may be RAN triggered for idle UEs, e.g., with a paging area that could be the same and/or different from a core network (CN) paging area. In some embodiments, if UE 1206b is in an idle state, the gNB 1202b may indicate the paging request to an MME/AMF. In some embodiments, the AMF may trigger the CN paging for side-link (V2X) usage.

Upon receiving the V2X paging 1220, UE 1206b, which may be a UE 106 as described above, may establish (and/or resume) a radio resource control (RRC) connection 1222 with gNB 1202b, which may be a base station 102 and/or a gNB 604 as described above. In other words, UE 1206b may enter a connected state with gNB 1202b. Thus, gNB 1202b may become a serving base station of UE 1206b. In some embodiments, as part of the connection procedure (and/or after establishment of the connection), the UE 1206b may send (or transmit/share) its V2X identifier, V2X capabilities, and associated cell information to gNB 1202b.

After establishing a connection with UE 1206b, the gNB 1202b may validate and/or authenticate the V2X information associated with UE 1206b prior to sharing UE 1206b's V2X information with the network (e.g., gNB 1202a). In some embodiments, gNB 1202b may perform a validity check and/or authentication based, at least in part, on any, any combination of, and/or all of an operations and management (OAM) channel check, core network (CN) key/authentication management field (AMF) key verification, and/or ProSe Function.

In addition, after establishing the connection with UE 1206b and/or after validating and/or authenticating the V2X information associated with UE 1206b, gNB 1202b may confirm the pairing of UEs 1206a and 1206b and may send (or transmit/share) a V2X pair confirmation 1224 with gNB 1202a.

UE 1206a may then receive a side-link (e.g., PC5) configuration 1226 from gNB 1202a. The side-link configuration 1226 may include any or all of layer 2 (L2) resource block (RB) allocation, L2 configuration, layer 1 (L1) configuration, a transmit/receive pool allocation, and/or an indication of a network scheduling method. Similarly, UE 1206b may receive a side-link (e.g., PC5) configuration 1228 from gNB 1202b. The side-link configuration 1228 may include any or all of layer 2 (L2) resource block (RB) allocation, L2 configuration, layer 1 (L1) configuration, a transmit/receive pool allocation, and/or an indication of a network scheduling method. Thereafter, the PC5 link 12130 between the UE 1206a and the UE 1206b may be established and PC5 data 1232 may be transmitted between the UE pair.

Figure 13:
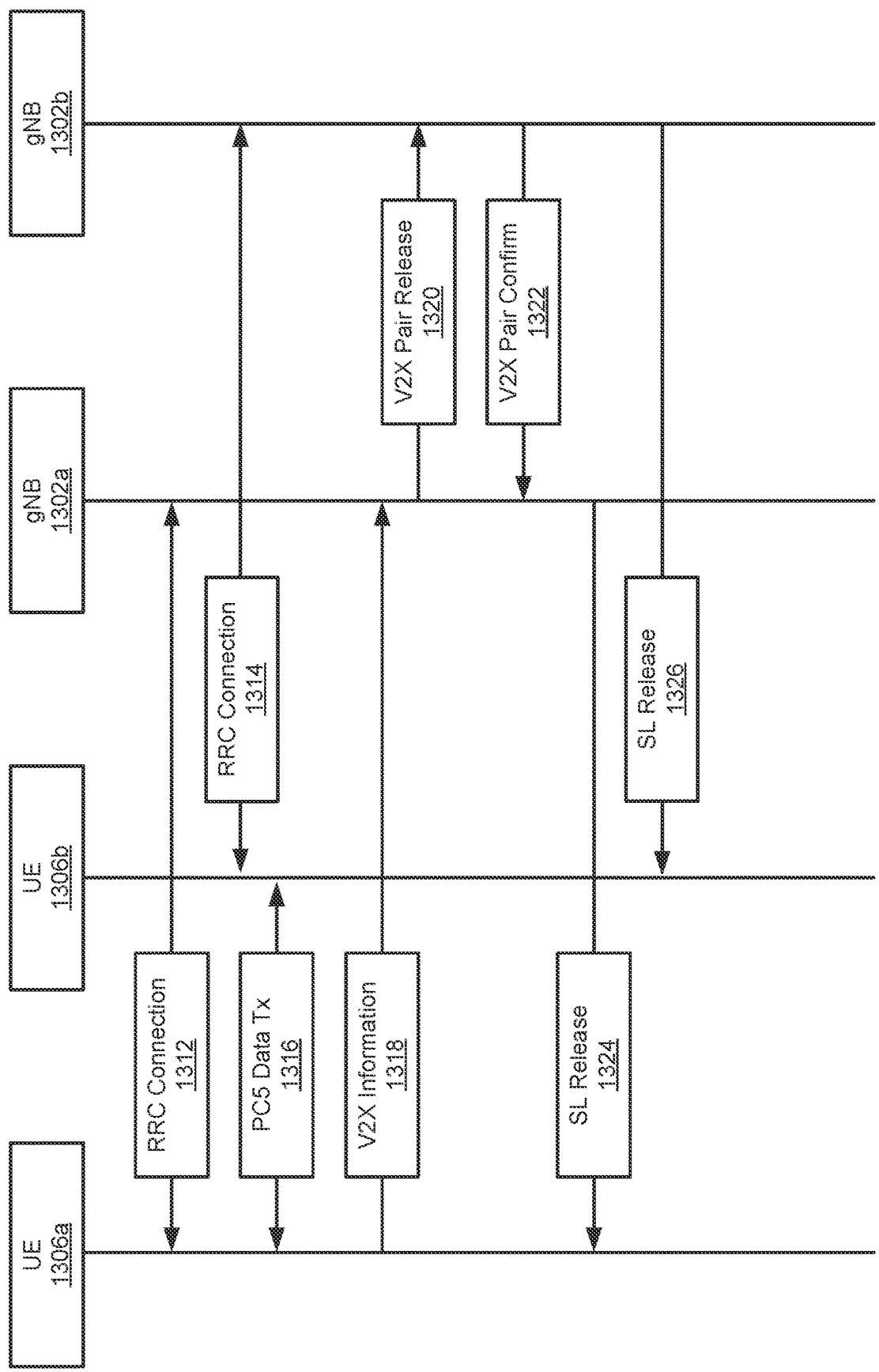
FIG. 13 illustrates a block diagram of an example of signaling for release of a network assisted side-link transmission configuration, according to some embodiments.

FIG. 13 illustrates a block diagram of an example of signaling for release of a network assisted side-link transmission configuration, according to some embodiments. The signaling shown in FIG. 13 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1306a, which may be a UE 106 as described above, may have previously established a radio resource control (RRC) connection 1312 with a gNB 1302a, which may be a base station 102 and/or a gNB 604 as described above. In other words, UE 1306a may be connected to (or in a connected state) with gNB 1302a. Thus, gNB 1302a may be considered a serving base station of UE 1306a. In some embodiments, as part of the connection procedure (and/or after establishment of the connection), the UE 1306a may have sent (or transmitted/shared) its V2X identifier, V2X capabilities, and associated cell information to gNB 1302a.

Similarly, a UE 1306b, which may be a UE 106 as described above, may have previously established a radio resource control (RRC) connection 1314 with a gNB 1302b, which may be a base station 102 and/or a gNB 604 as described above. In other words, UE 1306b may be connected to (or in a connected state) with gNB 1302b. Thus, gNB 1302b may be considered a serving base station of UE 1306b. In some embodiments, as part of the connection procedure (and/or after establishment of the connection), the UE 1306b may have sent (or transmitted/shared) its V2X identifier, V2X capabilities, and associated cell information to gNB 1302b.

The UEs 1306a and 1306b may be performing a PC5 data transmission 1316, e.g., established as described above. Upon completion of the PC5 data transmission 1316, UE 1306a may send (or transmit/share) V2X information 1318 to gNB 1302a. In some embodiments, the V2X information may include a destination identifier (e.g., identifying UE 1306b as a target UE), a V2X identifier associated with the UE 1306a, and an indication to discontinue a V2X configuration with a target UE. In other words, the UE 1306a may request assistance from gNB 1302a to terminate (or discontinue/release) a side-link with UE 1306b.

The gNB 1302a may send (or transmit/share) a V2X pair release 1320 with gNB 1302b. The V2X pair release 1320 may include and/or identify UE 1306b. Upon receiving the V2X pair release 1320, gNB 1302b may confirm the release (or termination) of the V2X session and send (or transmit/share) a V2X pair release confirmation 1322 with gNB 1302a. Subsequently, gNB 1302a may send (or transmit/share) a side-link release 1324 with UE 1306a. The side-link release 1324 may release side-link resources assigned to UE 1306a for the PC5 data transmission 1316. Similarly, gNB 1302b may send (or transmit/share) a side-link release 1326 with UE 1306b. The side-link release 1326 may release side-link resources assigned to UE 1306b for the PC5 data transmission 1316.

Figure 14:
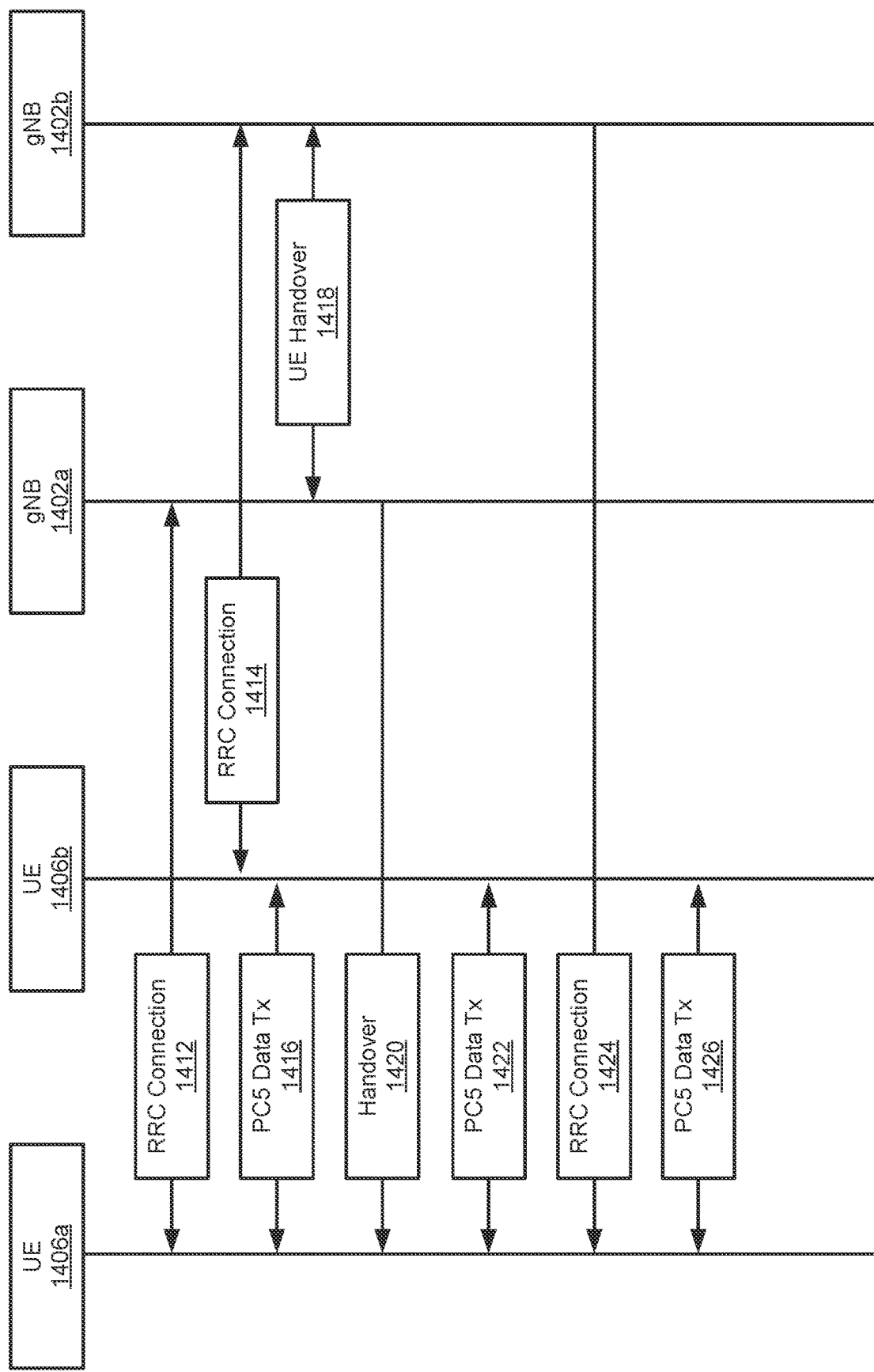
FIG. 14 illustrates a block diagram of an example of signaling for UE handover during a network assisted side-link transmission, according to some embodiments.

FIG. 14 illustrates a block diagram of an example of signaling for UE handover during a network assisted side-link transmission, according to some embodiments. The signaling shown in FIG. 14 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1406a, which may be a UE 106 as described above, may have previously established a radio resource control (RRC) connection 1412 with a gNB 1402a, which may be a base station 102 and/or a gNB 604 as described above. In other words, UE 1406a may be connected to (or in a connected state) with gNB 1402a. Thus, gNB 1402a may be considered a serving base station of UE 1406a. In some embodiments, as part of the connection procedure (and/or after establishment of the connection), the UE 1406a may have sent (or transmitted/shared) its V2X identifier, V2X capabilities, and associated cell information to gNB 1402a.

Similarly, a UE 1406b, which may be a UE 106 as described above, may have previously established a radio resource control (RRC) connection 1414 with a gNB 1402b, which may be a base station 102 and/or a gNB 604 as described above. In other words, UE 1406b may be connected to (or in a connected state) with gNB 1402b. Thus, gNB 1402b may be considered a serving base station of UE 1406b. In some embodiments, as part of the connection procedure (and/or after establishment of the connection), the UE 1406b may have sent (or transmitted/shared) its V2X identifier, V2X capabilities, and associated cell information to gNB 1402b.

The UEs 1406a and 1406b may be performing a PC5 data transmission 1416, e.g., established as described above. During the transmission, one of the gNBs 1402a and/or 1402b may detect a handover condition for one of the UEs 1406a and/or 1406b. For example, gNB 1402a may detect a handover condition and share/update location information (e.g., V2X identifiers, base station information, cell information) via a handover exchange 1418 with gNB 1402b. In addition, gNB 1402a may send a handover command 1420 to UE 1402a. The handover command 1420 may include an indication for UE 1402a to continue the PC5 data transmission in an exceptional pool (e.g., PC5 data transmission 1422) during the handover procedure. Upon completion of the handover, UE 1402a may establish an RRC connection 1424 with gNB 1402b. In some embodiments, as part of the connection procedure (and/or after establishment of the connection), the UE 1406a may have sent (or transmitted/shared) its V2X identifier, V2X capabilities, and associated cell information to gNB 1402b. Further, after completion of the handover, the PC5 data transmission may resume in a transmit pool (e.g., PC5 data transmission 1426.

Figure 15:
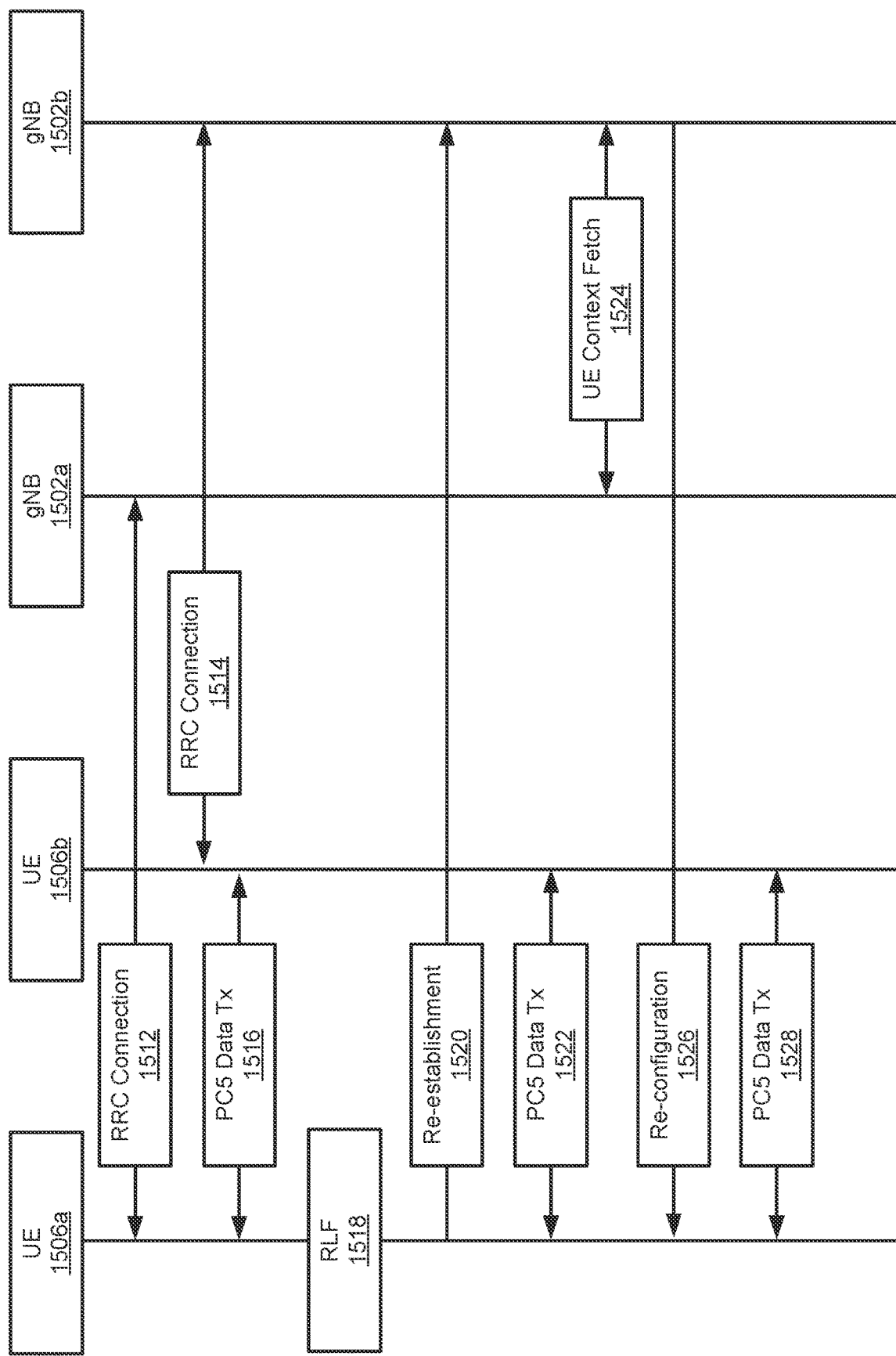
FIG. 15 illustrates a block diagram of an example of signaling for UE re-establishment after a radio link failure during a network assisted side-link transmission, according to some embodiments.

FIG. 15 illustrates a block diagram of an example of signaling for UE re-establishment after a radio link failure during a network assisted side-link transmission, according to some embodiments. The signaling shown in FIG. 15 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1506a, which may be a UE 106 as described above, may have previously established a radio resource control (RRC) connection 1512 with a gNB 1502a, which may be a base station 102 and/or a gNB 604 as described above. In other words, UE 1506a may be connected to (or in a connected state) with gNB 1502a. Thus, gNB 1502a may be considered a serving base station of UE 1506a. In some embodiments, as part of the connection procedure (and/or after establishment of the connection), the UE 1506a may have sent (or transmitted/shared) its V2X identifier, V2X capabilities, and associated cell information to gNB 1502a.

Similarly, a UE 1506b, which may be a UE 106 as described above, may have previously established a radio resource control (RRC) connection 1515 with a gNB 1502b, which may be a base station 102 and/or a gNB 604 as described above. In other words, UE 1506b may be connected to (or in a connected state) with gNB 1502b. Thus, gNB 1502b may be considered a serving base station of UE 1506b. In some embodiments, as part of the connection procedure (and/or after establishment of the connection), the UE 1506b may have sent (or transmitted/shared) its V2X identifier, V2X capabilities, and associated cell information to gNB 1502b.

The UEs 1506a and 1506b may be performing a PC5 data transmission 1516, e.g., established as described above. During the transmission, one of the UEs 1506a and/or 1506b may experience a radio link failure (RLF). For example, UE 1506a may experience an RLF 1518 and initiate a re-establishment procedure (e.g., via re-establishment request 1520) with gNB 1502b. In some embodiments, during the re-establishment procedure, UE 1502a may continue with the PC5 data transmission in an exceptional pool (e.g., PC5 data transmission 1522). Further, gNBs 1502a and 1502b may update location information associated with UE 1506a (e.g., via UE context fetch 1524). The updated location information may include V2X identifiers, base station information, and/or cell information. Further, as part of the UE context fetch 1524, gNB 1502b may determine a V2X configuration based on the updated location information of the UE, e.g., via a handover command. The gNB 1502b may additionally initiate a re-establishment/re-configuration procedure (e.g., re-configuration 1526) with UE 1502a. The re-establishment/re-configuration procedure may include an updated (or new) side-link configuration based on the updated location information of UE 1502a. Upon completion of the re-establishment procedure, UE 1502a may establish an RRC connection with gNB 1502b. In some embodiments, as part of the connection procedure (and/or after establishment of the connection), the UE 1506a may have sent (or transmitted/shared) its V2X identifier, V2X capabilities, and associated cell information to gNB 1502b. Further, after completion of the handover, the PC5 data transmission may resume in a transmit pool (e.g., PC5 data transmission 1528.

Figure 16:
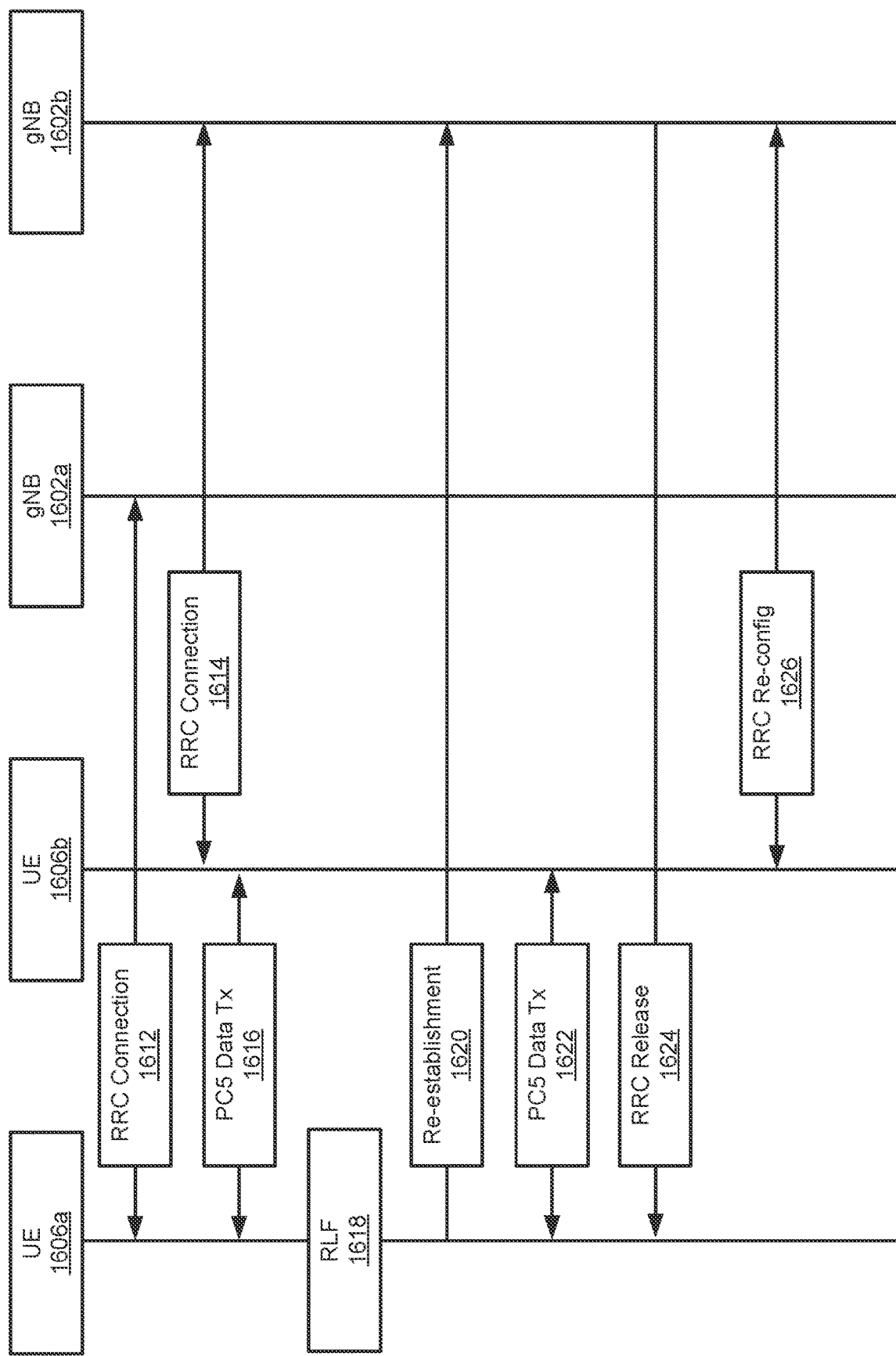
FIG. 16 illustrates a block diagram of an example of signaling for UE re-establishment failure after a radio link failure during a network assisted side-link transmission, according to some embodiments.

FIG. 16 illustrates a block diagram of an example of signaling for UE re-establishment failure after a radio link failure during a network assisted side-link transmission, according to some embodiments. The signaling shown in FIG. 16 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1606a, which may be a UE 106 as described above, may have previously established a radio resource control (RRC) connection 1612 with a gNB 1602a, which may be a base station 102 and/or a gNB 604 as described above. In other words, UE 1606a may be connected to (or in a connected state) with gNB 1602a. Thus, gNB 1602a may be considered a serving base station of UE 1606a. In some embodiments, as part of the connection procedure (and/or after establishment of the connection), the UE 1606a may have sent (or transmitted/shared) its V2X identifier, V2X capabilities, and associated cell information to gNB 1602a.

Similarly, a UE 1606b, which may be a UE 106 as described above, may have previously established a radio resource control (RRC) connection 1616 with a gNB 1602b, which may be a base station 102 and/or a gNB 604 as described above. In other words, UE 1606b may be connected to (or in a connected state) with gNB 1602b. Thus, gNB 1602b may be considered a serving base station of UE 1606b. In some embodiments, as part of the connection procedure (and/or after establishment of the connection), the UE 1606b may have sent (or transmitted/shared) its V2X identifier, V2X capabilities, and associated cell information to gNB 1602b.

The UEs 1606a and 1606b may be performing a PC5 data transmission 1616, e.g., established as described above. During the transmission, one of the UEs 1606a and/or 1606b may experience a radio link failure (RLF). For example, UE 1606a may experience an RLF 1618 and initiate a re-establishment procedure (e.g., via re-establishment request 1620) with gNB 1602b. In some embodiments, during the re-establishment procedure, UE 1602a may continue with the PC5 data transmission in an exceptional pool (e.g., PC5 data transmission 1622). In some embodiments, the re-establishment procedure may not be successful (e.g., may fail). Thus, gNB 1602b may send an RRC release command 1624 to UE 1606a. The RRC release command 1624 may clear (delete) the V2X configuration and indicate that UE 1606a enter an idle state. Further, gNB 1602b may send an RRC re-configuration command 1626 to UE 1606b, including release (e.g., clearing and/or deleting) of the V2X configuration. In some embodiments, the release of the V2X configuration may proceed similarly to release of other UE access stratum configurations.

Figure 17:
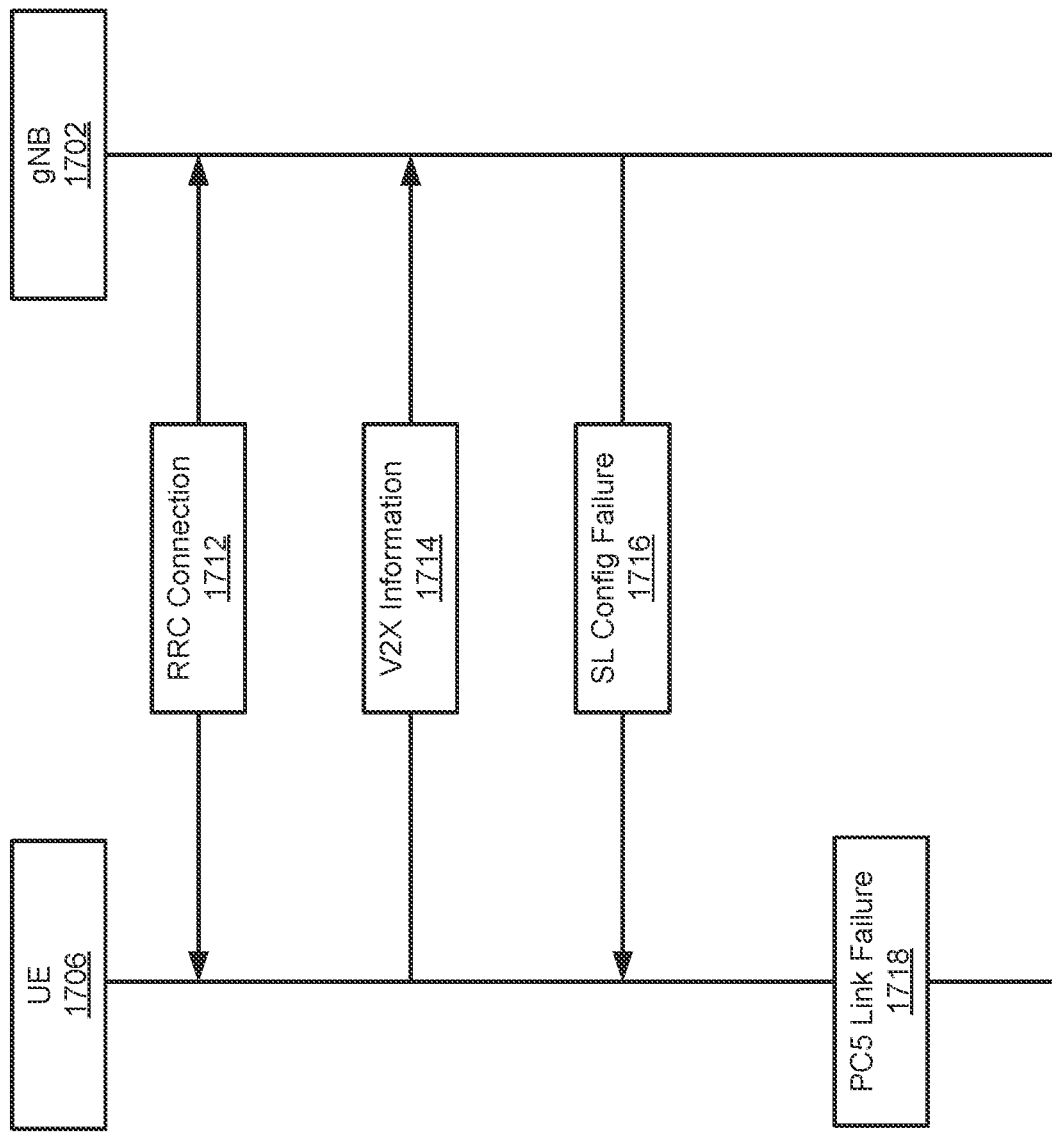
FIG. 17 illustrates a block diagram of an example of signaling for network assisted side-link configuration and setup failure, according to some embodiments.

FIG. 17 illustrates a block diagram of an example of signaling for network assisted side-link configuration and setup failure, according to some embodiments. The signaling shown in FIG. 17 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1706, which may be a UE 106 as described above, may establish (or have previously established) a radio resource control (RRC) connection 1712 with a gNB 1702, which may be a base station 102 and/or a gNB 604 as described above. In other words, UE 1706 may be connected to (or in a connected state) with gNB 1702. Thus, gNB 1702 may be considered a serving base station of UE 1706. Further, UE 1706 may send (or transmit) V2X information 1714 to gNB 1702. In some embodiments, the V2X information may include a destination identifier, a V2X identifier associated with the UE 1706, traffic QoS requirements, traffic QoS pattern, and/or PC5 capabilities. In other words, the UE 1706 may request assistance with configuration of a side-link with a target UE. In some embodiments, if gNB 1702 cannot identify and/or locate the target UE, e.g., based on the provided destination identifier, the gNB 1702 may send a side-link configuration failure message 1716 to UE 1706. Thus, the PC5 link may fail at 1718 and the side-link may not be established with the target UE. In some embodiments, the UE 1706 may report the side-link failure to upper layers of the UE 1706.

Figure 18:
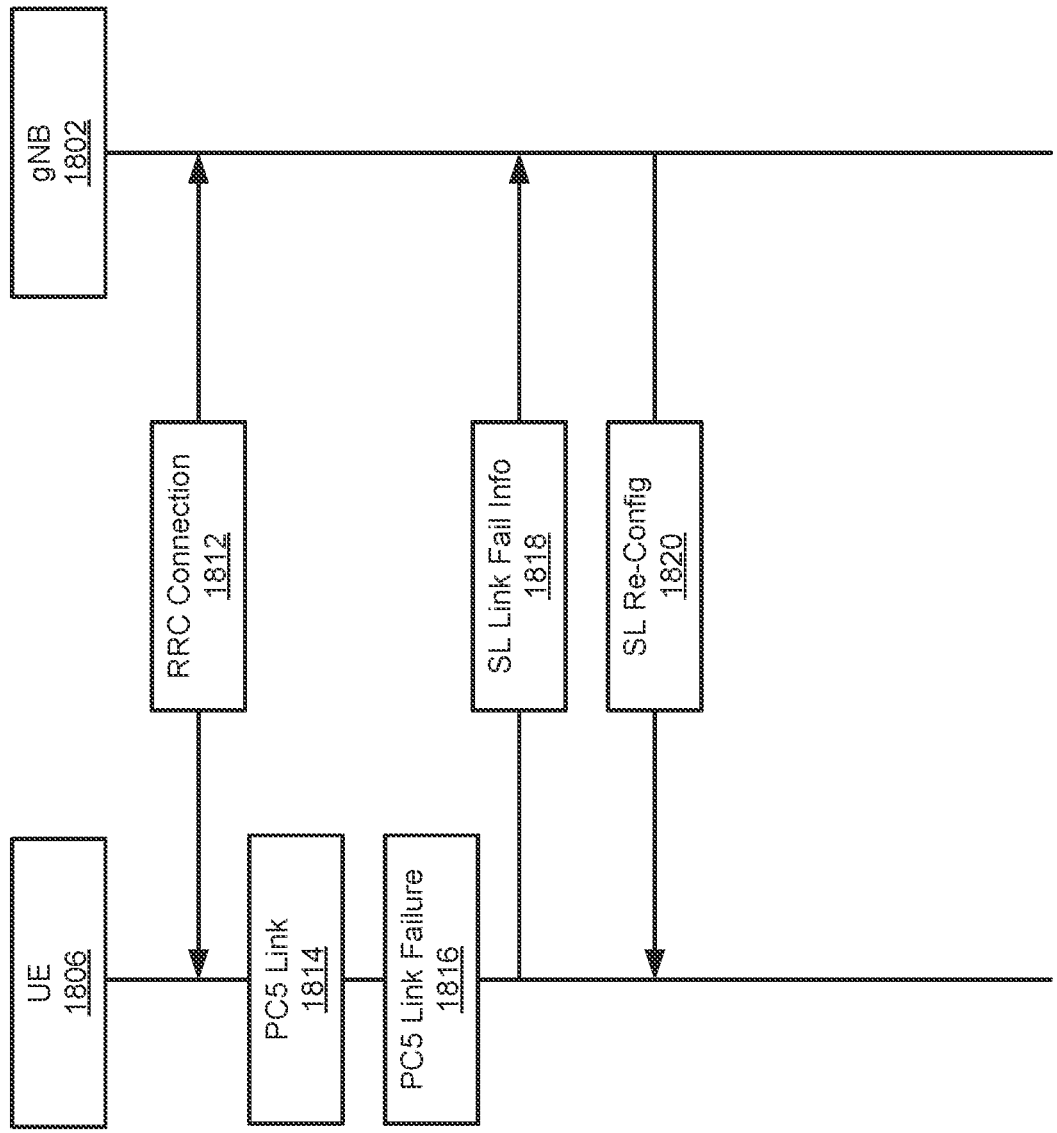
FIG. 18 illustrates a block diagram of an example of signaling for network assisted recovery from a side-link failure, according to some embodiments.

FIG. 18 illustrates a block diagram of an example of signaling for network assisted recovery from a side-link failure, according to some embodiments. The signaling shown in FIG. 18 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1806, which may be a UE 106 as described above, may have previously established a radio resource control (RRC) connection 1812 with a gNB 1802, which may be a base station 102 and/or a gNB 604 as described above. In other words, UE 1806 may be connected to (or in a connected state) with gNB 1802. Thus, gNB 1802 may be considered a serving base station of UE 1806. In some embodiments, as part of the connection procedure (and/or after establishment of the connection), the UE 1806 may have sent (or transmitted/shared) its V2X identifier, V2X capabilities, and associated cell information to gNB 1802.

The UE 1806 may have PC5 data link 1814 for transmitting data to a paired UE. During the transmission, UE 1806 may experience a failure of the PC5 link (e.g., PC5 link failure 1816). For example, if radio conditions worsen, the UE 1806 may suspend PC5 transmissions/receptions and may fall back to Uu interface with gNB 1802. In response, the UE 1806 may send (or transmit) side-link failure information 1818 to gNB 1802. In some embodiments, the side-link failure information may include a failure cause and corresponding measurement results. In some embodiments, if the UE 1806 does not have a connection with gNB 1802 (and/or has lost connection), the UE 1806 may re-establish a connection with gNB 1802 prior to sending the side-link failure information 1818.

Upon receipt of the side-link failure information 1818, the gNB 1802 may release and/or re-configure the side-link configuration and resource to the UE 1806 and the paired UE. For example, the gNB 1802 may send the side-link reconfiguration 1820 to UE 1806. In some embodiments, if the paired UEs belong to different gNBs and the network maintains the V2X UE pair (e.g., via re-configuration), then the gNB 1802 may coordinate with the gNB serving the paired UE on the side-link re-configuration.

Figure 19:
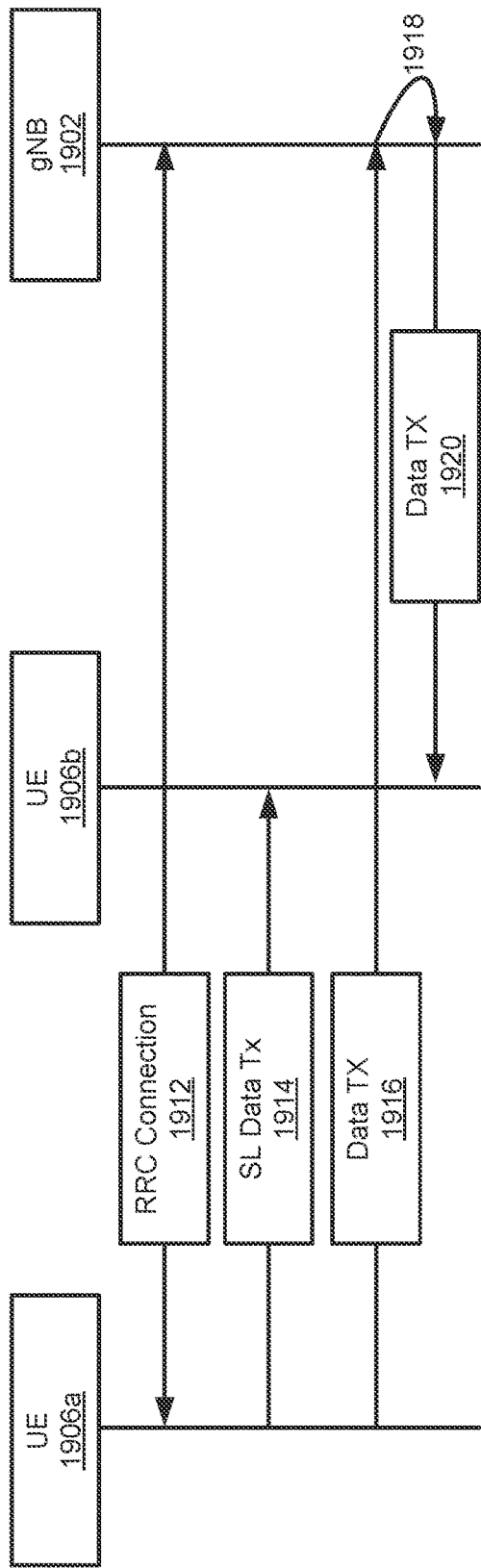
FIG. 19 illustrates a block diagram of an example of signaling for network assisted side-link data transmission, according to some embodiments.

FIG. 19 illustrates a block diagram of an example of signaling for network assisted side-link data transmission, according to some embodiments. The signaling shown in FIG. 19 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 1906a, which may be a UE 106 as described above, may have previously established a radio resource control (RRC) connection 1912 with a gNB 1902, which may be a base station 102 and/or a gNB 604 as described above. In other words, UE 1906a may be connected to (or in a connected state) with gNB 1902. Thus, gNB 1902 may be considered a serving base station of UE 1906a. In some embodiments, as part of the connection procedure (and/or after establishment of the connection), the UE 1906a may have sent (or transmitted/shared) its V2X identifier, V2X capabilities, and associated cell information to gNB 1902.

The UE 1906a may have a side-link established with UE 1906b and may be transmitting side-link data 1914 to UE 1906b. In some embodiments, the UE 1906a may maintain both a PC5 link with UE 1906b and a UU link with gNB 1902 for a V2X service transmission that may have been configured by the network, e.g., as described above. Thus, UE 1906a may be transmitting the side-link data to gNB 1902 via data transmission 1916. In some embodiments, the UE 1906a may establish a V2X bearer with a split and/or duplicated model. In some embodiments, the V2X bearer may be anchored at a packet data convergence protocol (PDCP) layer of a protocol stack implemented on UE 1906a. In some embodiments, the V2X bearer may be anchored at a service data adaptation protocol (SDAP) layer of a protocol stack implemented on the UE 1906a. Thus, the UE 1906a may transmit the side-link data via multiple links. In some embodiments, the UE 1906a may transmit the same packet on both links (e.g., duplication mode). In some embodiments, the UE 1906a may transmit on the PC5 link and only switch to the Uu link if channel conditions worsen. As shown, the gNB 1902 may receive the side-link data and relay (e.g., at 1918) the side-link to UE 1906b via data transmission 1920. In some embodiments, UE 1906b may receive the side-link data via both the PC5 link and the Uu link.

Figure 20:
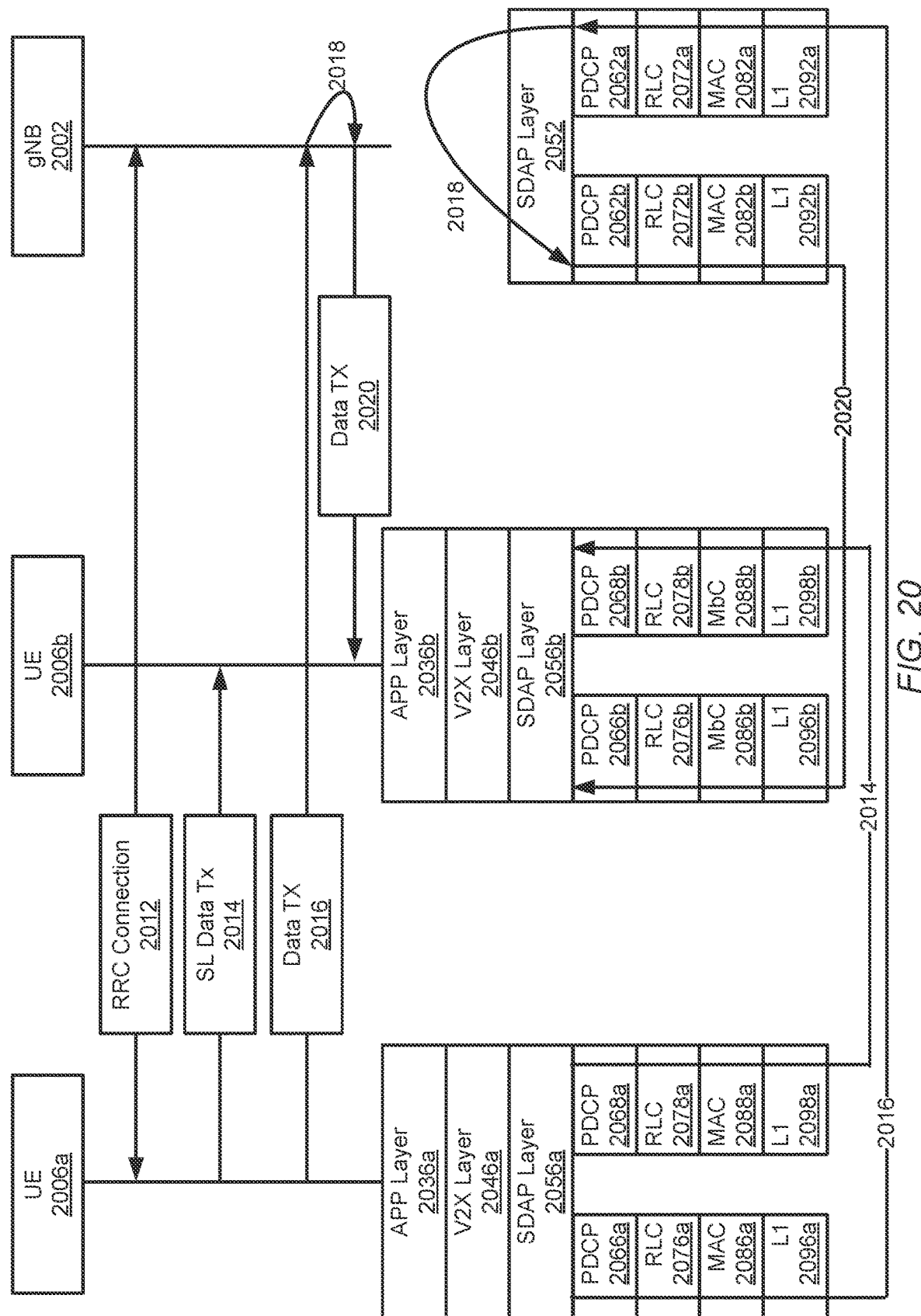
FIG. 20 illustrates a block diagram of an example of signaling for network assisted side-link data transmission with SDAP duplication, according to some embodiments.

FIG. 20 illustrates a block diagram of an example of signaling for network assisted side-link data transmission with SDAP duplication, according to some embodiments. The signaling shown in FIG. 20 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 2006a, which may be a UE 106 as described above, may have previously established a radio resource control (RRC) connection 2012 with a gNB 2002, which may be a base station 102 and/or a gNB 604 as described above. In other words, UE 2006a may be connected to (or in a connected state) with gNB 2002. Thus, gNB 2002 may be considered a serving base station of UE 2006a. In some embodiments, as part of the connection procedure (and/or after establishment of the connection), the UE 2006a may have sent (or transmitted/shared) its V2X identifier, V2X capabilities, and associated cell information to gNB 2002.

In some embodiments, a protocol stack may be implemented on and/or by UE 2006a. As shown, the protocol stack may include an application layer 2036a, a V2X layer 2046a, and an SDAP layer 2056a. The SDAP layer 2056a may anchor both a PC5 link with UE 2006b and a Uu link with gNB 2002. Lower layers may be split between the PC5 link and the Uu link. Thus, lower layers may include PDCP layers 2066a and 2068a, RLC layers 2076a and 2078a, MAC layers 2086a and 2088a, and/or L1 layers 2096a and 2098a.

As noted, the UE 2006a may have a side-link (PC5 link) established with UE 2006b and may be transmitting side-link data 2014 to UE 2006b. UE 2006b may also implement a protocol stack similar to UE 2006a. Thus, the protocol stack may include an application layer 2036b, a V2X layer 2046b, and an SDAP layer 2056b. The SDAP layer 2056b may anchor both a PC5 link with UE 2006a and a Uu link with gNB 2002. Lower layers may be split between the PC5 link and the Uu link. Thus, lower layers may include PDCP layers 2066b and 2068b, RLC layers 2076b and 2078b, MAC layers 2086b and 2088b, and/or L1 layers 2096b and 2098b. In addition, gNB 2002 may also implement a split protocol stack that may include an SDAP layer 2052. The SDAP layer 2052 may anchor both a Uu link with UE 2006a and a Uu link with UE 2006b. Lower layers may be split between the Uu links. Thus, lower layers may include PDCP layers 2062a and 2062b, RLC layers 2072a and 2072b, MAC layers 2082a and 2082b, and/or L1 layers 2092a and 2092b.

As shown, side-link data 2014 may be received at SDAP layer 2056a from upper layers and SDAP layer 2056a may add a sequence number (SN) to each SDAP service data unit (SDU) used to transmit data. The side-link data 2014 may pass through the lower layers of UE 2006a and eventually be received at PCDP layer 2066b of UE 2006b and passed on to SDAP layer 2056b of UE 2006b. Similarly, transmitted data 2016 may pass through the lower layers of UE 2006a and eventually be received at PCDP layer 2062a and passed on to SDAP layer 2052 of gNB 2002. SDAP layer 2052 may forward (e.g., at 2018) the received data to PDCP layer 2062b for transmission to UE 2006b via PDCP layer 2066b. In some embodiments, both data transmissions may be received at the SDAP layer 2056b. SDAP layer 2056b may perform duplication detection based on the SN and may discard duplicated packets prior to forwarding the data on to higher layers.

Figure 21:
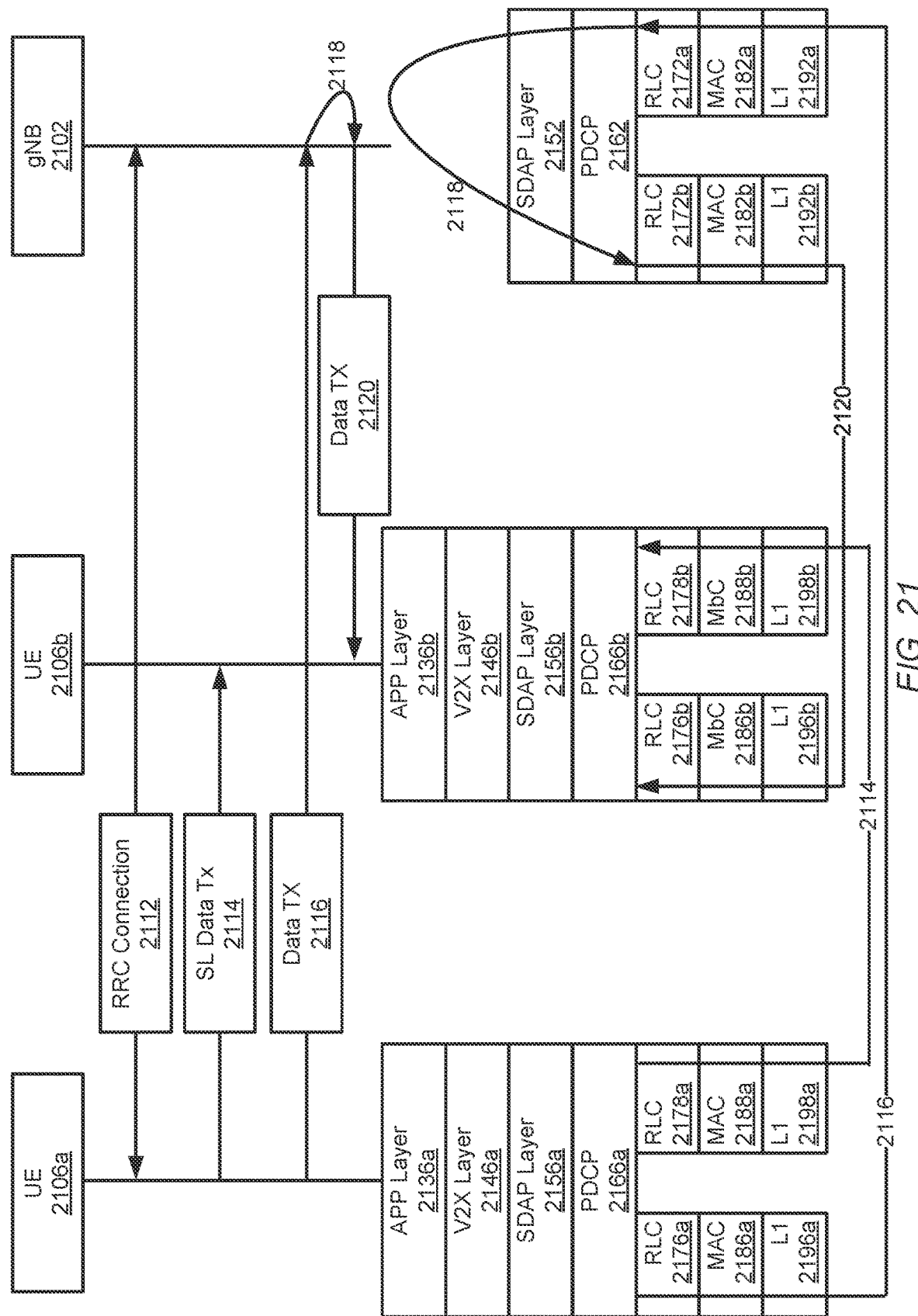
FIG. 21 illustrates a block diagram of an example of signaling for network assisted side-link data transmission with PDCP duplication, according to some embodiments.

FIG. 21 illustrates a block diagram of an example of signaling for network assisted side-link data transmission with PDCP duplication, according to some embodiments. The signaling shown in FIG. 21 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 2106a, which may be a UE 106 as described above, may have previously established a radio resource control (RRC) connection 2112 with a gNB 2102, which may be a base station 102 and/or a gNB 604 as described above. In other words, UE 2106a may be connected to (or in a connected state) with gNB 2102. Thus, gNB 2102 may be considered a serving base station of UE 2106a. In some embodiments, as part of the connection procedure (and/or after establishment of the connection), the UE 2106a may have sent (or transmitted/shared) its V2X identifier, V2X capabilities, and associated cell information to gNB 2102.

In some embodiments, a protocol stack may be implemented on and/or by UE 2106a. As shown, the protocol stack may include an application layer 2136a, a V2X layer 2146a, an SDAP layer 2156a, and a PDCP layer 2166a. The PDCP layer 2156a may anchor both a PC5 link with UE 2106b and a Uu link with gNB 2102. Lower layers may be split between the PC5 link and the Uu link. Thus, lower layers may include RLC layers 2176a and 2178a, MAC layers 2186a and 2188a, and/or L1 layers 2196a and 2198a.

As noted, the UE 2106a may have a side-link (PC5 link) established with UE 2106b and may be transmitting side-link data 2114 to UE 2106b. UE 2106b may also implement a protocol stack similar to UE 2106a. Thus, the protocol stack may include an application layer 2136b, a V2X layer 2146b, an SDAP layer 2156b, and a PDCP layer 2166b. The PDCP layer 2166b may anchor both a PC5 link with UE 2106a and a Uu link with gNB 2102. Lower layers may be split between the PC5 link and the Uu link. Thus, lower layers may include RLC layers 2176b and 2178b, MAC layers 2186b and 2188b, and/or L1 layers 2196b and 2198b. In addition, gNB 2102 may also implement a split protocol stack that may include an SDAP layer 2152 and a PDCP layer 2162. The PDCP layer 2162 may anchor both a Uu link with UE 2106a and a Uu link with UE 2106b. Lower layers may be split between the Uu links. Thus, lower layers may include RLC layers 2172a and 2172b, MAC layers 2182a and 2182b, and/or L1 layers 2192a and 2192b.

As shown, side-link data 2114 may be received at PDCP layer 2166a from upper layers and PDCP layer 2166a may apply a security key and add a sequence number (SN) to each PDCP packet data unit (SDU) used to transmit data. The side-link data 2114 may pass through the lower layers of UE 2106a and eventually be received at PCDP layer 2166 of UE 2106b. Similarly, transmitted data 2116 may have the same security key applied and pass through the lower layers of UE 2106a and eventually be received at PCDP layer 2162 and passed on to PDCP layer 2162 of gNB 2102. PDCP layer 2162 may forward (e.g., at 2118) the received data for transmission to UE 2106b via PDCP layer 2166b. In some embodiments, both data transmissions may be received at the PDCP layer 2166b. PDCP layer 2166b may perform duplication detection based on the SN and may discard duplicated packets prior to forwarding the data on to higher layers.

Figure 22:
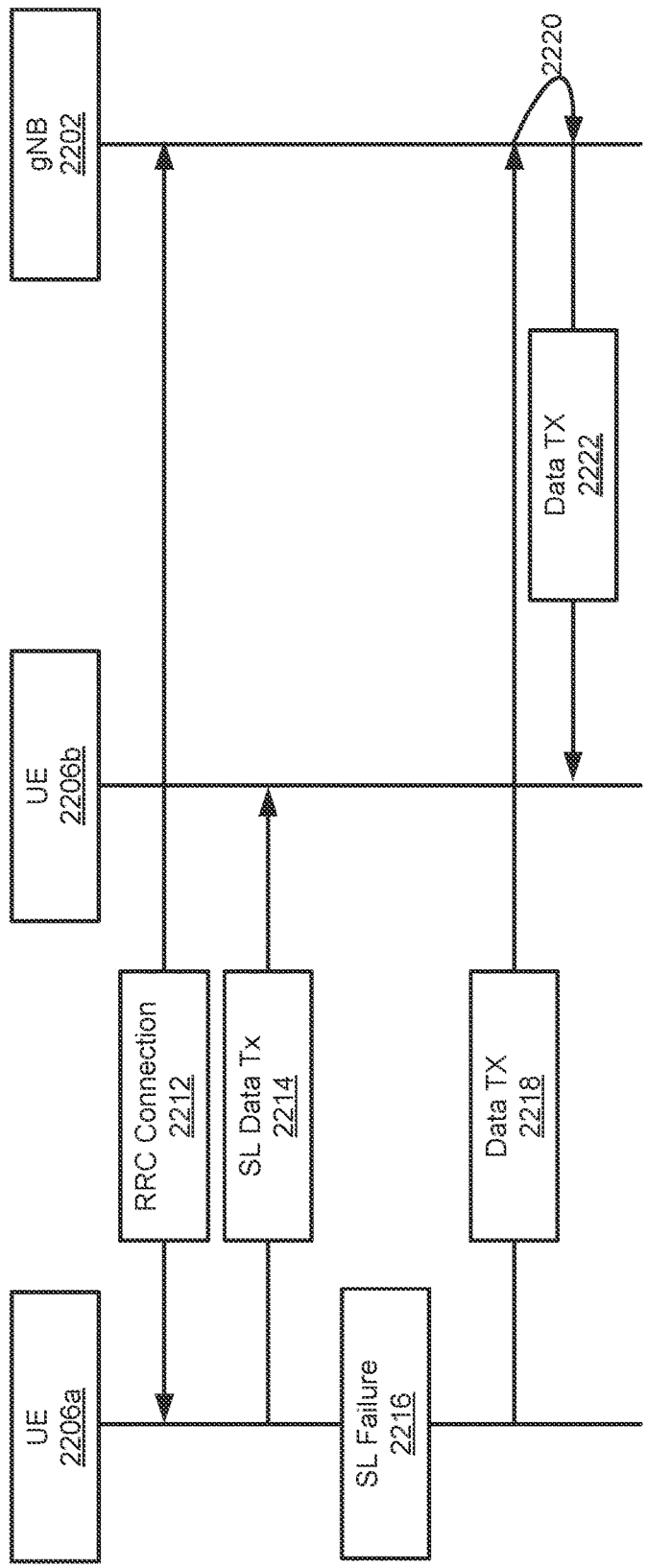
FIG. 22 illustrates a block diagram of another example of signaling for network assisted side-link data transmission, according to some embodiments.

FIG. 22 illustrates a block diagram of another example of signaling for network assisted side-link data transmission, according to some embodiments. The signaling shown in FIG. 22 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling may proceed as follows.

As shown, a UE 2206a, which may be a UE 106 as described above, may have previously established a radio resource control (RRC) connection 2212 with a gNB 2202, which may be a base station 102 and/or a gNB 604 as described above. In other words, UE 2206a may be connected to (or in a connected state) with gNB 2202. Thus, gNB 2202 may be considered a serving base station of UE 2206a. In some embodiments, as part of the connection procedure (and/or after establishment of the connection), the UE 2206a may have sent (or transmitted/shared) its V2X identifier, V2X capabilities, and associated cell information to gNB 2202.

The UE 2206a may have a side-link established with UE 2206b and may be transmitting side-link data 2214 to UE 2206b. In some embodiments, the UE 2206a may maintain both a PC5 link with UE 2206b and a UU link with gNB 2202 for a V2X service transmission that may have been configured by the network, e.g., as described above. Thus, upon detecting a side-link failure 2216, the UE 2206a may transmit the side-link data to gNB 2202 via data transmission 2218, e.g., as a fallback to the PC5 link. In some embodiments, the UE 2206a may establish a V2X bearer with a split and/or duplicated model. In some embodiments, the V2X bearer may be anchored at a PDCP layer or an SDAP layer of a protocol stack implemented on UE 2206a. Thus, the UE 2206a may transmit the side-link data via multiple links. As shown, the gNB 2202 may receive the side-link data and relay (e.g., at 2220) the side-link to UE 2206b via data transmission 2222.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform communications; and
wherein the one or more processors are configured to cause the UE to:
establish a radio resource control (RRC) connection with a first base station, including sharing, with the first base station, vehicle-to-everything (V2X) information including a destination identifier associated with an other UE, V2X capabilities of the UE, and associated cell information;
perform PC5 data transmissions with the other UE, wherein the other UE has an RRC connection with a second base station;
receive, during the PC5 data transmissions, a handover command from the first base station, wherein the handover command includes an indication to continue the PC5 data transmissions in an exceptional pool during a handover procedure to the second base station; and
establish an RRC connection with the second base station as part of the handover procedure.

2. The UE of claim 1,
wherein the one or more processors are further configured to cause the UE to:
resume, after completion of the handover procedure, the PC5 data transmissions with the other UE in a transmit pool.

3. The UE of claim 1,
wherein the one or more processors are further configured to cause the UE to:
receive, from the first base station, a side-link configuration for PC5 data transmissions with the other UE.

4. The UE of claim 3,
wherein the side-link configuration includes a resource allocation defined in time and frequency.

5. The UE of claim 4
wherein the side-link configuration further includes at least one of:
layer two resource blocks; or
a layer one configuration.

6. The UE of claim 4,
wherein the resource allocation specifies a transmit/receive pool of resource blocks defined in time and frequency.

7. The UE of claim 1,
wherein, to establish the RRC connection with the second base station, the one or more processors are further configured to cause the UE to:
share, with the second base station, a V2X identifier, V2X capabilities of the UE, and associated cell information.

8. A base station, comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform communications; and
wherein the one or more processors are configured to cause the base station to:
establish a radio resource control (RRC) connection with a first user equipment (UE), including receiving, from the first UE, vehicle-to-everything (V2X) information including a destination identifier associated with a second UE, V2X capabilities of the first UE, and associated cell information;
detect, during PC5 data transmissions between the first UE and the second UE, a handover condition associated with the first UE; and
transmit, during the PC5 data transmissions, a handover command to the first UE, wherein the handover command includes an indication to continue the PC5 data transmissions in an exceptional pool during a handover procedure to an other base station, and wherein the second UE has an RRC connection to the other base station.

9. The base station of claim 8,
wherein the one or more processors are further configured to cause the base station to:
share location information associated with the first UE with the other base station.

10. The base station of claim 9,
wherein the location information includes a V2X identifier of the first UE, V2X capabilities of the first UE, and cell information.

11. The base station of claim 8,
wherein, to establish the RRC connection with the first UE, the one or more processors are further configured to cause the base station to:
transmit, to the first UE, a side-link configuration for PC5 data transmissions with the second UE, wherein the side-link configuration includes a resource allocation defined in time and frequency.

12. The base station of claim 11,
wherein the side-link configuration further includes at least one of:
layer two resource blocks; or
a layer one configuration.

13. The base station of claim 11,
wherein the resource allocation specifies a transmit/receive pool of resource blocks defined in time and frequency.

14. A method for user equipment (UE) handover during a network assisted side-link transmission, comprising:
a base station
establishing a radio resource control (RRC) connection with a first user equipment (UE), including receiving, from the first UE, vehicle-to-everything (V2X) information including a destination identifier associated with a second UE, V2X capabilities of the first UE, and associated cell information;
detecting, during PC5 data transmissions between the first UE and the second UE, a handover condition associated with the first UE; and
transmitting, during the PC5 data transmissions, a handover command to the first UE, wherein the handover command includes an indication to continue the PC5 data transmissions in an exceptional pool during a handover procedure to an other base station, and wherein the second UE has an RRC connection to the other base station.

15. The method of claim 14, further comprising:
the base station,
sharing location information associated with the first UE with the other base station.

16. The method of claim 15,
wherein the location information includes a V2X identifier of the first UE, V2X capabilities of the first UE, and cell information.

17. The method of claim 14, further comprising:
the base station,
transmitting, to the first UE, a side-link configuration for PC5 data transmissions with the second UE.

18. The method of claim 17, wherein the side-link configuration includes layer two recourse blocks.

19. The method of claim 18,
wherein the side-link configuration further includes a layer one configuration.

20. The method of claim 17,
wherein the side-link configuration includes a resource allocation that specifies a transmit/receive pool of resource blocks defined in time and frequency.

* * * * *